(12) United States Patent
Kobayashi et al.

(10) Patent No.: US 9,599,462 B2
(45) Date of Patent: Mar. 21, 2017

(54) THREE-DIMENSIONAL SHAPE MEASUREMENT APPARATUS AND CONTROL METHOD THEREOF

(71) Applicant: CANON KABUSHIKI KAISHA, Tokyo (JP)

(72) Inventors: Toshihiro Kobayashi, Tokyo (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 14/541,665

(22) Filed: Nov. 14, 2014

(65) Prior Publication Data

US 2015/0146215 A1    May 28, 2015

(30) Foreign Application Priority Data

Nov. 25, 2013    (JP) ................................ 2013-243343

(51) Int. Cl.
     *G01B 11/25*      (2006.01)

(52) U.S. Cl.
     CPC ...... *G01B 11/2504* (2013.01); *G01B 11/2513* (2013.01)

(58) Field of Classification Search
     CPC ........ G06T 7/20; G01B 11/25; G01B 11/2513
     USPC ....................... 356/37.1–237.6, 239.1, 239.4
     See application file for complete search history.

(56) References Cited

U.S. PATENT DOCUMENTS

| | | | |
|---|---|---|---|
| 6,739,516 B2 * | 5/2004 | Iwaki | G01B 11/2509 235/454 |
| 6,792,370 B2 | 9/2004 | Satoh et al. | |
| 6,993,450 B2 | 1/2006 | Takemoto et al. | |
| 7,053,916 B2 | 5/2006 | Kobayashi et al. | |
| 7,092,109 B2 * | 8/2006 | Satoh | G06F 3/0325 356/620 |
| 7,130,754 B2 | 10/2006 | Satoh et al. | |
| 7,379,060 B2 | 5/2008 | Kobayashi et al. | |
| 7,664,341 B2 | 2/2010 | Takemoto et al. | |

(Continued)

FOREIGN PATENT DOCUMENTS

| | | |
|---|---|---|
| JP | H05-248830 A | 9/1993 |
| JP | H08-054234 A | 2/1996 |

OTHER PUBLICATIONS

Koichiro Deguchi, "Fundamentals of Robot Vision," 2000, pp. 42-45, Corona Publishing.

(Continued)

*Primary Examiner* — Kara E Geisel
*Assistant Examiner* — Shawn Decenzo
(74) *Attorney, Agent, or Firm* — Fitzpatrick, Cella, Harper & Scinto

(57) ABSTRACT

To measure the three-dimensional shape of a target object with higher accuracy, a three-dimensional shape measurement apparatus projects a pattern image to a predetermined measurement area including a support structure on which the target object is placed; and captures an image of the predetermined measurement area. In addition, the apparatus derives, based on the captured image, a first correction value for correcting a position fluctuation of a support structure, and a second correction value for correcting a fluctuation of a projection position; and calculates, based on the captured image and the first correction value and the second correction value, a plurality of coordinates on a surface of the target object.

15 Claims, 14 Drawing Sheets

(56) References Cited

U.S. PATENT DOCUMENTS

| | | | |
|---|---|---|---|
| 7,848,903 B2 | 12/2010 | Aratani et al. | |
| 7,860,345 B2 | 12/2010 | Satoh et al. | |
| 8,223,146 B2 | 7/2012 | Kotake et al. | |
| 8,483,424 B2 | 7/2013 | Kotake et al. | |
| 8,718,405 B2 | 5/2014 | Fujiki et al. | |
| 8,786,700 B2 | 7/2014 | Kobayashi et al. | |
| 2010/0289797 A1 | 11/2010 | Tateno et al. | |
| 2010/0328682 A1 | 12/2010 | Kotake et al. | |
| 2012/0262455 A1 | 10/2012 | Watanabe et al. | |
| 2013/0076865 A1 | 3/2013 | Tateno et al. | |
| 2013/0108116 A1 | 5/2013 | Suzuki et al. | |
| 2013/0121592 A1 | 5/2013 | Fujiki et al. | |
| 2013/0223673 A1* | 8/2013 | Davis | G06K 9/78 382/100 |
| 2013/0236062 A1 | 9/2013 | Kotake et al. | |
| 2013/0245828 A1 | 9/2013 | Tateno et al. | |
| 2014/0205152 A1 | 7/2014 | Fujiki et al. | |
| 2015/0124055 A1* | 5/2015 | Kotake | H04N 13/0246 348/46 |

OTHER PUBLICATIONS

Richard Hartley and Andrew Zisserman, "Multiple View Geometry in Computer Vision", 2004, pp. 279-309, Cambridge University Press.

* cited by examiner

F I G. 1
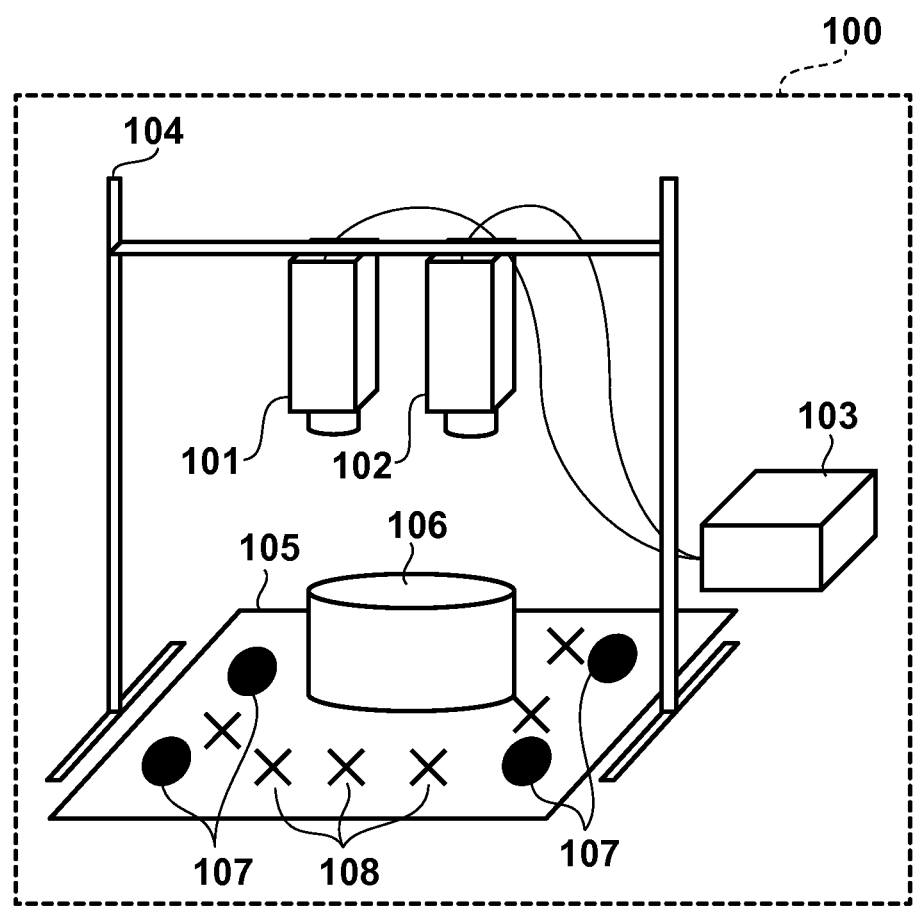

F I G. 3
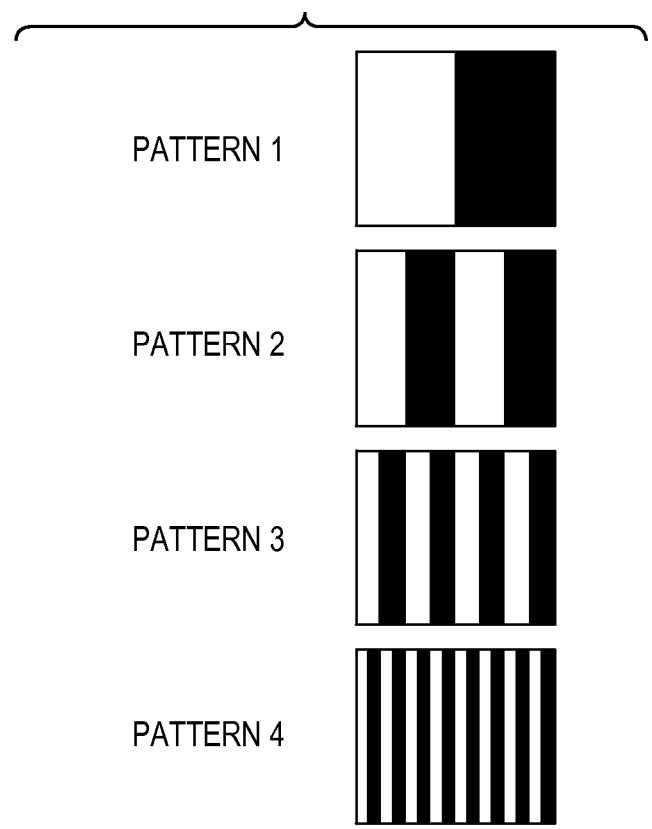
F I G. 4
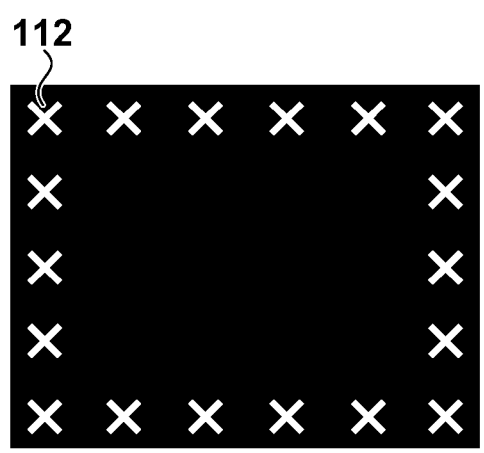

THREE-DIMENSIONAL SHAPE MEASUREMENT APPARATUS AND CONTROL METHOD THEREOF

BACKGROUND OF THE INVENTION

Field of the Invention

The present invention relates to a technique of measuring the three-dimensional shape of a target object.

Description of the Related Art

There is widely known a three-dimensional shape measurement apparatus that obtains a three-dimensional coordinate by the triangulation principle based on a striped pattern typified by binary or Gray code structured light or a phase shift, or the observation position of reflected light of light projected to a target object in an image capturing unit. This apparatus may not obtain desired measurement accuracy upon a change of the geometric relation between the three-dimensional shape measurement apparatus and a target object owing to the vibration of a structure supporting the apparatus. Also, the apparatus may not obtain desired measurement accuracy upon a change of the position of a pattern or laser spot projected to a target object owing to the temporal fluctuation of the geometric relation between the image capturing unit and the projection unit. To solve these problems, for example, Japanese Patent Laid-Open No. 8-54234 (patent literature 1) has proposed a method of measuring a reference object that is arranged together with a target object and has a known true value of the distance, and correcting the position coordinate of spot light based on a shift of the light projection angle of a mirror and a shift of the image capturing angle from reference states. Japanese Patent Laid-Open No. 5-248830 (patent literature 2) has proposed a method of splitting beam light by a splitter, observing the temporal fluctuation of the beam light by a position detection device for correction, and correcting a measured value.

The fluctuation of the geometric relation between the three-dimensional shape measurement apparatus and a target object due to the vibration of the support structure, and the fluctuation of the position of a pattern or laser spot projected to the target object occur independently, but are interdependent in general. In other words, these two fluctuations are observed while being influenced mutually. For example, even if a pattern shift is corrected by the method described in patent literature 2, an error arising from the vibration of the three-dimensional shape measurement apparatus cannot be completely removed. In the method described in patent literature 1, a measured value itself used for correction has an error at the stage of triangulation under the influence of the temporal fluctuation of projected light. Even by using a measured value based on triangulation, the error of the motion amount of the entire apparatus cannot be completely corrected. Even by simultaneously applying a plurality of methods premised on that only one of these two fluctuations occurs, as in the above-mentioned methods, an error remains to a certain extent, and no satisfactory measurement accuracy can be obtained.

SUMMARY OF THE INVENTION

According to one aspect of the present invention, a three-dimensional shape measurement apparatus that measures a three-dimensional shape of a target object, comprises: a projection unit configured to project a pattern image to a predetermined measurement area including a support structure on which the target object is placed, the projection unit being configured to project a coordinate calculation pattern image to the target object and project a marker pattern image to the support structure; an image capturing unit configured to capture an image of the predetermined measurement area; a derivation unit configured to derive, based on an image captured by the image capturing unit when the projection unit projects the marker pattern image to the support structure, a first correction value for correcting a position fluctuation of a support structure that fixes the projection unit and the image capturing unit, and a second correction value for correcting a fluctuation of a projection position by the projection unit; and a coordinate calculation unit configured to calculate a plurality of coordinates on a surface of the target object based on an image captured by the image capturing unit when the projection unit projects the coordinate calculation pattern image to the target object, and the first correction value and the second correction value that have been derived by the derivation unit.

According to another aspect of the present invention, a three-dimensional shape measurement apparatus that measures a three-dimensional shape of a target object, comprises: a projection unit configured to project a pattern image to a predetermined measurement area including a support structure on which the target object is placed and a plurality of stereoscopic reference markers not on the same plane are arranged, the projection unit being configured to project a coordinate calculation pattern image to the target object; an image capturing unit configured to capture an image of the predetermined measurement area; a first derivation unit configured to derive, based on an image captured by the image capturing unit, a first correction value for correcting a fluctuation of a projection position by the projection unit; a second derivation unit configured to derive, based on images of the plurality of stereoscopic reference markers included in the image captured by the image capturing unit, a second correction value for correcting a position fluctuation of a support structure that fixes the projection unit and the image capturing unit; and a coordinate calculation unit configured to calculate a plurality of coordinates on a surface of the target object based on an image captured by the image capturing unit when the projection unit projects the coordinate calculation pattern image to the target object, the first correction value, and the second correction value.

According to still another aspect of the present invention, a three-dimensional shape measurement apparatus that measures a three-dimensional shape of a target object, comprises: a projection unit configured to project a pattern image to a predetermined measurement area including a support structure on which the target object is placed; an image capturing unit configured to capture an image of the predetermined measurement area; a robot hand unit configured to integrally control positions and orientations of both of a support structure that fixes the projection unit and the image capturing unit, and a marker supporting member on which a reference marker is arranged; the projection unit being configured to project a coordinate calculation pattern image to the target object and project a marker pattern image to the marker support structure; a derivation unit configured to derive, based on an image captured by the image capturing unit when the projection unit projects the marker pattern image to the marker support structure, a first correction value for correcting a position fluctuation of the support structure, and a second correction value for correcting a fluctuation of a projection position by the projection unit; and a coordinate calculation unit configured to calculate a plurality of coordinates on a surface of the target object based on an image captured by the image capturing unit when the projection unit projects the coordinate calculation pattern image to the target object, and the first correction value and the second correction value that have been derived by the derivation unit.

According to yet another aspect of the present invention, a three-dimensional shape measurement apparatus that measures a three-dimensional shape of a target object, comprises: a projection unit configured to project a pattern image to a predetermined measurement area including a support structure on which the target object is placed and a reference marker is arranged, the projection unit being configured to project a coordinate calculation pattern image to the target object; an image capturing unit configured to capture an image of the predetermined measurement area; a derivation unit configured to derive, based on an image captured by the image capturing unit when the projection unit projects the coordinate calculation pattern image to the target object, a first correction value for correcting a position fluctuation of a support structure that fixes the projection unit and the image capturing unit, and a second correction value for correcting a fluctuation of a projection position by the projection unit; and a coordinate calculation unit configured to calculate a plurality of coordinates on a surface of the target object based on an image captured by the image capturing unit when the projection unit projects the coordinate calculation pattern image to the target object, and the first correction value and the second correction value that have been derived by the derivation unit.

According to still yet another aspect of the present invention, a method of controlling a three-dimensional shape measurement apparatus that measures a three-dimensional shape of a target object, the three-dimensional shape measurement apparatus includes: a projection unit configured to project a pattern image to a predetermined measurement area including a support structure on which the target object is placed and a plurality of reference markers are arranged on the same plane, the projection unit being configured to project a coordinate calculation pattern image to the target object and project a marker pattern image to the support structure; and an image capturing unit configured to capture an image of the predetermined measurement area, the control method comprises: deriving, based on an image captured by the image capturing unit when the projection unit projects the marker pattern image to the support structure, a first correction value for correcting a position fluctuation of a support structure that fixes the projection unit and the image capturing unit, and a second correction value for correcting a fluctuation of a projection position by the projection unit; and calculating a plurality of coordinates on a surface of the target object based on an image captured by the image capturing unit when the projection unit projects the coordinate calculation pattern image to the target object, and the first correction value and the second correction value that have been derived in the deriving.

The present invention can provide a technique capable of measuring the three-dimensional shape of a target object with higher accuracy.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view schematically showing the overall arrangement of a three-dimensional shape measurement apparatus according to the first embodiment;

FIG. 3 is a view showing an example of a pattern image as stripes for binary code structured light;

FIG. 4 is a view showing an example of a pattern image for forming projection markers;

DESCRIPTION OF THE EMBODIMENTS

Figure 2:
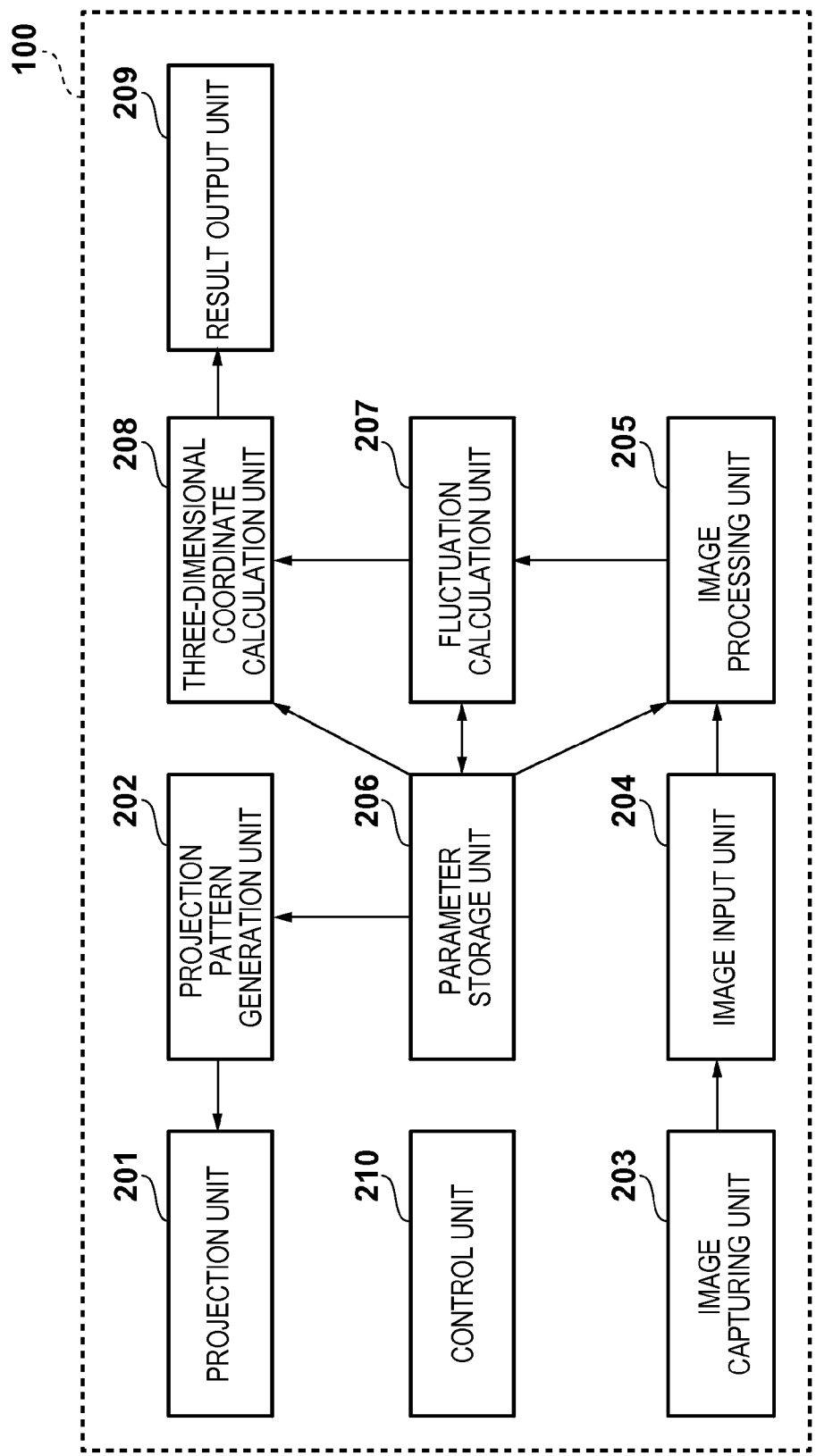
FIG. 2 is a functional block diagram showing the three-dimensional shape measurement apparatus according to the first embodiment.

Preferred embodiments of the present invention will now be described in detail with reference to the accompanying drawings. Note that the following embodiments are merely examples and are not intended to limit the scope of the invention.

First Embodiment

The first embodiment of a three-dimensional shape measurement apparatus according to the present invention will be described by exemplifying a three-dimensional shape measurement apparatus using reference markers arranged near a target object, and projection markers projected near the target object from a projection unit.

<1. Apparatus Arrangement>

FIG. 1 is a view schematically showing the overall arrangement of the three-dimensional shape measurement apparatus according to the first embodiment. The arrangement in FIG. 1 is merely an example, and the three-dimensional shape measurement apparatus is not limited to the illustrated arrangement. A three-dimensional shape measurement apparatus 100 includes a projection device 101, an image capturing device 102, a control unit 103, a support structure 104, and a target object support structure 105. The three-dimensional shape measurement apparatus 100 measures the three-dimensional coordinate of a target object 106 placed on the target object support structure 105 (support structure). Note that reference markers 107 are arranged on the target object support structure 105.

The projection device 101 projects light to the target object 106. The projection device 101 is constituted by a light source, a display element, a projection optical system, a control circuit, and the like. Light generated by the light source is modulated by an image (to be referred to as a pattern image hereinafter) displayed on the display element, and is projected through the projection optical system. The projected light modulated by the pattern image will be called pattern light. The pattern light can be arbitrarily controlled by changing a pattern image. The pattern light is reflected by the surface of the target object 106, and its image is captured by the image capturing device 102.

The pattern image is supplied from the control unit 103 to the display element via, for example, a general-purpose interface. Alternatively, a memory may be arranged inside the projection device 101 and store images in advance. Another example of the projection device 101 can be a projection unit that generates and scans a laser beam, or a projection unit that projects arbitrary pattern light by quickly driving many micromirrors arranged side by side.

The image capturing device 102 captures an image of the target object 106. The image capturing device 102 is constituted by an image sensor, a shutter, an optical system, a control circuit, and the like. Pattern light projected by the projection device 101 is reflected by the surfaces of the target object 106 and reference markers 107, and enters the image capturing device 102. The reflected light forms an image on the image sensor through an imaging optical system, generating an image based on a signal intensity detected by the image sensor. The generated image is then sent to the control unit 103. The shutter of the image capturing device 102 is controlled in synchronism with projection of pattern light from the projection device 101, and the image capturing device 102 captures an image in synchronism with the pattern projection by the projection device 101.

The control unit 103 controls the operations of the projection device 101 and image capturing device 102 by an internal computer and an electrical circuit. The control unit 103 performs processing of calculating the three-dimensional coordinate of the target object 106 based on an image captured by the image capturing device 102.

The support structure 104 (support structure) is a structure for fixing and supporting the projection device 101 and the image capturing device 102. Assume that the support structure 104 vibrates to generate relative vibrations between the three-dimensional shape measurement apparatus 100 and the target object 106.

The target object support structure 105 is a table for setting the target object 106 on it. On the target object support structure 105, the reference markers 107 are arranged at locations falling within the field of view of the projection device 101 and around the target object 106, as described above. Note that the target object 106 is an object to undergo three-dimensional shape measurement.

The reference markers 107 are a plurality of marks arranged on the target object support structure 105, and are used to detect the vibration of the support structure 104. The reference markers 107 need not always exist on the target object support structure 105, but need to exist in the field of view of the image capturing device 102. The reference marker 107 has a disk shape here, but is not limited to this.

Projection markers 108 are images that are projected from the projection device 101 and have a specific shape. The projection markers 108 are projected based on projection marker patterns 112 to be described later (FIG. 4). Note that the projection marker pattern 112 (FIG. 4) is discriminated from a pattern (FIG. 3 to be described later) used to three-dimensionally measure the target object 106. Assume that the projection markers 108 are projected on the target object support structure 105 at positions where the target object 106 is not arranged. Note that the projection marker 108 need not always be projected on the target object support structure 105, but need to exist in the field of view of the image capturing device 102 and on the same plane.

To project the projection markers 108 in this fashion, pixel regions for forming the projection markers 108 are formed in a part of pattern image used in the projection device 101. The projection device 101 forms the projection markers 108 by projecting this pattern image. Note that the reference markers 107 are physically arranged on the target object support structure 105, whereas the projection markers 108 are images formed on the target object support structure 105 by part of an image projected from the projection device 101. Thus, the reference markers 107 and the projection markers 108 are different markers.

FIG. 3 is a view showing an example of a pattern image (coordinate calculation pattern image) as stripes for binary code structured light. FIG. 4 is a view showing an example of a pattern image (marker pattern image) for forming projection markers. In the example of FIG. 4, the plurality of projection marker patterns 112 are arranged around the striped pattern image (FIG. 3) for calculating a three-dimensional coordinate. Hence, the striped pattern image is projected to the target object 106, and the projection markers 108 are projected around the target object 106 on the target object support structure 105.

FIG. 2 is a functional block diagram showing the three-dimensional shape measurement apparatus according to the first embodiment. A projection unit 201 projects, to the target object 106, pattern light based on a pattern image that has been generated and input by a projection pattern generation unit 202. Note that the projection is controlled when the projection unit 201 receives a projection control signal sent from a control unit 210. In this case, the projection device 101 implements the function of the projection unit 201.

The projection pattern generation unit 202 generates a pattern image and sends it to the projection unit 201. The projection pattern generation unit 202 also generates the projection markers 108 necessary to calculate the temporal position fluctuation of projected light. For example, separately from the striped pattern image in FIG. 3, the projection pattern generation unit 202 generates a pattern image formed from only the projection marker patterns 112, and sends it to the projection unit 201, too. The projection marker pattern 112 is a pattern embedded in a pattern image to generate the images of the projection markers 108 upon projection on the target object support structure 105 by the projection device 101.

As the patterns (FIG. 3) used for three-dimensional measurement, and the projection marker patterns 112 (FIG. 4), various patterns can be used depending on the target object, environment, and the like. Note that a parameter storage unit 206 may be configured to hold all kinds of pattern images in advance. In this case, the projection pattern generation unit 202 sequentially reads out pattern images from the parameter storage unit 206 and sends them to the projection unit 201. Assume that the control unit 103 implements the function of the projection pattern generation unit 202. However, the projection device 101 may implement the function of the projection pattern generation unit 202.

An image capturing unit 203 receives an image capturing control signal sent from the control unit 210, and at this timing, captures an image at a shutter speed, f-number, and focus position designated in advance. The captured image is sent to an image input unit 204. The control unit 210 controls to synchronously execute projection and image capturing by sending control signals to the projection unit 201 and the image capturing unit 203 at the same time. The image capturing device 102 implements the function of the image capturing unit 203.

The image input unit 204 receives an image captured by the image capturing unit 203 and holds it in a memory area (not shown). Normally in a three-dimensional measurement method using striped pattern image projection as in structured light, a three-dimensional coordinate is calculated using a plurality of images captured by emitting different patterns. The image input unit 204 sequentially receives images from the image capturing unit 203 and adds them to the memory area. Upon receiving a plurality of images necessary for one three-dimensional coordinate calculation, the image input unit 204 outputs the images held in the memory area to an image processing unit 205. In addition, the image input unit 204 holds, in the memory area, an image captured by projecting a pattern image formed from only the projection marker patterns 112, and sends it to the image processing unit 205. The control unit 103 implements the function of the image input unit 204.

The image processing unit 205 receives a captured image from the image input unit 204 and performs necessary image processing. The image processing to be performed by the image processing unit 205 includes decoding processing of pattern light included in an image, extraction processing of the reference markers 107 and projection markers 108, and normalization processing of a projection coordinate and image coordinate.

The normalization of a projection coordinate and image coordinate to be performed by the image processing unit 205 is executed according to equation (1) by inputting the internal parameters of the projection device 101 and image capturing device 102 from the parameter storage unit 206. u' and v' are projection coordinates or image coordinates after normalization, u and v are projection coordinates or image coordinates before normalization, $c_x$ and $c_y$ are the coordinates of a principal point position, and $f_x$ and $f_y$ are horizontal and vertical focal lengths. The following description assumes that projection coordinates and image coordinates have been normalized.

$$\begin{pmatrix} u' \\ v' \end{pmatrix} = \begin{pmatrix} \frac{u - c_x}{f_x} \\ \frac{v - c_y}{f_y} \end{pmatrix} \quad (1)$$

When an image has a distortion originated from the optical system, the image processing unit 205 also performs processing of correcting and removing the distortion.

The image processing unit 205 performs pattern decoding processing using a plurality of images input from the image processing unit 205. By this decoding processing, the image processing unit 205 associates the pixels of a pattern image projected by the projection device 101 with the pixels of an image captured by the image capturing device 102. More specifically, the image processing unit 205 derives the correspondence between part of pattern light corresponding to each pixel of the pattern image, and a pixel of the image capturing device 102 in which the part was captured upon reflection on the surface of the target object 106. Based on this correspondence, and the geometric relation between the projection device 101 and the image capturing device 102, the image processing unit 205 calculates the three-dimensional coordinate of the surface of the target object 106 by the triangulation principle. The control unit 103 implements the function of the image processing unit 205.

The parameter storage unit 206 holds various parameters necessary for the three-dimensional shape measurement method. The parameters include settings for controlling the projection device 101 and the image capturing device 102, the calibration results of the projection device 101 and image capturing device 102, and an image coordinate and projection coordinate at reference time that are used in a fluctuation calculation unit 207. The control unit 103 implements the function of the parameter storage unit 206.

The fluctuation calculation unit 207 calculates both the temporal position fluctuation of projected light and the vibration of the support structure 104. Details of this calculation processing will be described later. The control unit 103 implements the function of the fluctuation calculation unit 207.

<2. Arrangement of Fluctuation Calculation Unit 207>

As described above, measured values derived using a plurality of images input from the image processing unit 205 can only be obtained depending on both the temporal position fluctuation of projected light and the vibration of the support structure 104. No satisfactory correction is possible unless the influence of one of the fluctuation and vibration in the course of detecting the other one of them is considered. The first embodiment removes the influence of interdependence by detecting the fluctuation and vibration, and iteratively repeating the detection processing while correcting the influence of the other one of the fluctuation and vibration.

Assume that two types of geometric relations change:
the geometric relation between the projection device 101 and the image capturing device 102
the geometric relation between the support structure 104 on which the projection device 101 and the image capturing device 102 are installed, and the target object support structure 105

In the first embodiment, as for the geometric relation between the projection device 101 and the image capturing device 102, a pattern projected by the projection device 101 is corrected using homography, instead of correcting direct physical amounts such as the optical center between the projection device 101 and the image capturing device 102, and three-dimensional translation and rotation.

<2.1. Derivation Processing of Vibration (First Correction Value) of Support Structure 104>

The fluctuation calculation unit 207 calculates the three-dimensional coordinates of the plurality of reference markers 107 by using associated image coordinates and projection coordinates. These three-dimensional coordinates are compared with those calculated in a reference state, and the relative three-dimensional translation/rotation amount of the coordinate group is calculated. The relative three-dimensional translation/rotation amount of the coordinate group is regarded as the vibration of the support structure 104 and undergoes correction processing.

($x_{vkt}$, $y_{vkt}$) and $u_{pkt}$ are an image coordinate and a projection coordinate at time t, respectively. Assume that these coordinates have already been normalized. The first embodiment does not use the longitudinal component (v coordinate) of the projection coordinate. Assuming that there are $p_i$ image coordinates within the area of reference markers 107 in the image and the total number of observed reference markers 107 is m, the total number of image coordinates and projection coordinates is $M_P$:

$$M_P = \Sum_{i=1}^{m} p_i \quad (2)$$

therefore a range of k is k=1, 2, ..., $M_P$.

The fluctuation calculation unit 207 transforms the projection coordinate $u_{pkt}$ into $u'_{pkt}$ based on equation (3) using homography $H_p$ calculated at the time of detecting the temporal fluctuation of projected light. If there is no other error factor, this transform processing can remove the influence of the projection pattern fluctuation from the projection coordinate. Calculation processing of the homography $H_p$ will be described later. At the time of first execution, $H_p$ has not been calculated yet, and a unit matrix is desirably set as $H_p$. Note that $\lambda_{pk}$ is a scaling coefficient and is not used in subsequent processing:

$$\lambda_{pk} \begin{pmatrix} u'_{pkt} \\ 0 \\ 1 \end{pmatrix} = H_p \begin{pmatrix} u_{pkt} \\ 0 \\ 1 \end{pmatrix} \quad (3)$$

Then, the fluctuation calculation unit 207 receives calibration values from the parameter storage unit 206, and calculates three-dimensional coordinates for all points k=1, 2, ..., $M_P$. The calibration values include so-called intrinsic parameters such as the focal lengths, optical center, and distortion coefficients unique to each of the projection device 101 and image capturing device 102. The calibration values also include extrinsic parameters serving as three-dimensional translation/rotations between the image capturing device 102 and the projection device 101.

$P_P$ is the projection matrix of the projection device 101, and $P_C$ is the projection matrix of the image capturing device 102. $P_P$ and $P_C$ are 3×4 matrices calculated from intrinsic parameters and extrinsic parameters, respectively. When the optical center of the image capturing device 102 is defined as the origin of the world coordinate system of the measurement area, $P_C$ is defined by only the intrinsic parameters of the image capturing device 102. $P_P$ is defined by the three-dimensional translation/rotation between the image capturing device 102 and the projection device 101, and the product of the intrinsic parameters of the projection device 101. When the origin of the world coordinate system of the measurement area is set at another location, $P_C$ and $P_P$ are further multiplied by a three-dimensional translation/rotation from this point to the optical center of the image capturing device 102.

At this time, letting $M_{vkt} = (X_{vkt}, Y_{vkt}, Z_{vkt})^T$ be a three-dimensional coordinate to be obtained, the three-dimensional coordinate can be calculated as $M_{vkt} = A_{vkt}^{-1} B_{vkt}$ in which $A_{vkt}$ and $B_{vkt}$ are matrices defined by:

$$A_{vkt} = \begin{pmatrix} x_{vkt} p_{c31} - p_{c11} & x_{vkt} p_{c32} - p_{c12} & x_{vkt} p_{c33} - p_{c13} \\ y_{vkt} p_{c31} - p_{c21} & y_{vkt} p_{c32} - p_{c22} & y_{vkt} p_{c33} - p_{c23} \\ u'_{pkt} p_{P31} - p_{P11} & u'_{pkt} p_{P32} - p_{P12} & u'_{pkt} p_{P31} - p_{P13} \end{pmatrix} \quad (4)$$

$$B_{vkt} = \begin{pmatrix} p_{c14} - x_{vkt} p_{c34} \\ p_{c24} - y_{vkt} p_{c34} \\ p_{P14} - u'_{pkt} p_{P34} \end{pmatrix}$$

where $p_{cij}$ and $p_{pij}$ are the components of the matrices $P_P$ and $P_C$.

At reference time t=0, the fluctuation calculation unit 207 sends the reference image coordinate ($x_{vk0}$, $y_{vk0}$) and the reference three-dimensional coordinate $M_{vk0}$ to the parameter storage unit 206. The parameter storage unit 206 holds these parameters. At other times, these values are read out from the parameter storage unit 206.

Owing to the vibration of the support structure 104, the image coordinate and the projection coordinate change over time. ($x_{vkt}$, $y_{vkt}$), $u_{pkt}$, and ($X_{vkt}$, $Y_{vkt}$, $Z_{vkt}$) are the image coordinate and projection coordinate at time t, and a corresponding three-dimensional coordinate, respectively. At this time, on the premise that there is no fluctuation between the projection unit and the image capturing device, the fluctuation of the three-dimensional coordinate $M_{vkt} = (X_{vkt}, Y_{vkt}, Z_{vkt})$ on the reference marker 107 in the time axis direction can be regarded as the vibration of the support structure 104.

Letting $M_t = (M_{v1t}^T, M_{v2t}^T, ..., M_{vmt}^T)$ be a set of three-dimensional coordinates at time t, the translation/rotation amount between time t=0 and time t=T is expressed by a 3×4 matrix $R_T = (r_T | t_T)$, where $r_T$ is a matrix representing rotation of three rows and three columns, and $t_T$ is a three-dimensional vector representing translation.

The sets $M_0$ and $M_T$ of three-dimensional coordinates on the reference markers 107 at time t=0 and time t=T are points on the target object support structure 105, and thus can be considered to exist on the same plane. $n_0$ and $n_T$ are the normal vectors of these planes and are calculated by the fluctuation calculation unit 207. $n_0$ is calculated only at the time of first execution and is subsequently held in the parameter storage unit 206.

A plurality of known methods have been proposed for estimation of a plane with respect to a three-dimensional point group, and any method can be used. $r_T$ is a rotation matrix for transforming $n_0$ into $n_T$, and can be obtained as a rotation whose axis is a vector $n_a$ serving as the outer product of $n_0$ and $n_T$. The rotation angle at this time can be calculated from the inner product of $n_0$ and $n_T$. When $n_a = (n_{ax}, n_{ay}, n_{az})$ and the rotation angle is $\theta$, $r_T$ is obtained from:

$$r_T = \begin{pmatrix} n_{ax}^2 + (1 - n_{ax}^2)\cos\theta & n_{ax} n_{ay}(1 - \cos\theta) - n_{az}\sin\theta & n_{az} n_{ax}(1 - \cos\theta) + n_{ay}\sin\theta \\ n_{ax} n_{ay}(1 - \cos\theta) + n_{az}\sin\theta & n_{ay}^2 + (1 - n_{ay}^2)\cos\theta & n_{ay} n_{az}(1 - \cos\theta) - n_{ax}\sin\theta \\ n_{az} n_{ax}(1 - \cos\theta) - n_{ay}\sin\theta & n_{ay} n_{az}(1 - \cos\theta) + n_{ax}\sin\theta & n_{az}^2 + (1 - n_{az}^2)\cos\theta \end{pmatrix} \quad (5)$$

The translation component $t_T$ can be calculated from the average of the difference between $M_T$ and $M_0$. $R_T$ can be constituted by $r_T$ and $t_T$ calculated in this manner. The method of calculating $R_T$ is merely an example, and $R_T$ may be obtained by another known method. Instead of calculating $R_T$ based on only the reference markers 107, a position sensor, a rotation sensor, and the like may be installed in the support structure 104 to use pieces of information obtained from them, too. For example, when the iterative solution method is applied to calculation of $R_T$, information from the sensor can be used as an initial value.

<2.2. Derivation Processing of Fluctuation (Second Correction Value) of Projection Position of Projected Light>

$(u_{pk}, v_{pk})$ is the normalized coordinate of the projection marker pattern 112 in the pattern image. Letting n be the total number of the projection marker patterns 112, k=1, 2, ..., n. As for the projection marker pattern 112 shown in FIG. 4, the coordinate of the center at which the line segments of the x mark cross each other is defined as the coordinate of the projection marker pattern 112. $(x_{pk0}, y_{pk0})$ is a normalized coordinate at which the corresponding projection marker 108 is observed in the image. At this time, under the condition that all the projection markers 108 are on the same plane, a relation represented by equation (6) is established between $(u_{pk}, v_{pk})$ and $(x_{pk0}, y_{pk0})$ for all k:

$$\lambda_{pc0} \begin{pmatrix} x_{pk0} \\ y_{pk0} \\ 1 \end{pmatrix} = H_{pc0} \begin{pmatrix} u_{pk} \\ v_{pk} \\ 1 \end{pmatrix} \quad (6)$$

Here, $H_{pc0}$ is a 3×3 homography matrix. If N≥4, the homography matrix $H_{pc0}$ can be calculated using a method described in, for example, "Richard Hartley and Andrew Zisserman, Multiple View Geometry in Computer Vision, Cambridge University Press, 2004" (literature A). $\lambda_{pc0}$ is a scaling coefficient and is not used in subsequent processing.

At reference time t=0, the reference coordinate $(x_{vk0}, y_{vk0})$ and the reference homography $H_{pc0}$ are sent from the fluctuation calculation unit 207 to the parameter storage unit 206 and held there. At other times, these values are read out from the parameter storage unit 206.

A coordinate at which the projection marker 108 is observed changes over time owing to the temporal fluctuation of projected light. Thus, this coordinate is defined as $(x_{pkt}, y_{pkt})$ at time t. A relation represented by equation (7) is similarly established between $(u_{pk}, v_{pk})$ and $(x_{pkt}, y_{pkt})$ $$\lambda_{pct} \begin{pmatrix} x_{pkt} \\ y_{pkt} \\ 1 \end{pmatrix} = H_{pct} \begin{pmatrix} u_{pk} \\ v_{pk} \\ 1 \end{pmatrix} \quad (7)$$

Here, $H_{pct}$ is a 3×3 homography matrix, too, which can be calculated from the correspondence between $(u_{pk}, v_{pk})$ and $(x_{pkt}, y_{pkt})$, as in equation (6). The homography $H_p$ as a combination of $H_{pc0}$ and $H_{pct}$ calculated in the above way is given by equation (8). $\lambda_{pc0}$ is a scaling coefficient and is not used in subsequent processing.

$$H_p = H_{pct}^{-1} H_{vt} H_{pc0} H_{vt}^{-1} \quad (8)$$

$H_{vt}$ is a homography matrix transformed from the vibration of the support structure 104, and can be calculated using $R_T$:

$$H_{vt} = R_T + \frac{t_T n^T}{d} \quad (9)$$

Here, $r_T$ and $t_T$ are the rotation component and translation component, respectively, n is the normal vector of the target object support structure 105, and d is the length of a perpendicular from the optical center of the image capturing device 102 to the target object support structure 105. The internal parameters of the projection device 101, and the geometric relation between the projection device 101 and the image capturing device 102 change upon the temporal fluctuation of projected light. $H_p$ expresses the difference of the change amount. The vibration of the support structure 104 is compensated by $H_{vt}$.

<2.3. Repetitive (Iterative Execution) Control>

When the above-described detection processing of the vibration $R_T$ of the support structure 104 is executed for the first time, the temporal fluctuation $H_p$ of projected light has not been calculated yet. By only simply executing the above-described detection processing, the interdependent fluctuation amount cannot be detected correctly, and its influence cannot be removed completely.

Considering this, the above-described two detection processes are repetitively executed. Especially in the second and subsequent processes, the temporal fluctuation $H_p$ of projected light obtained immediately before the process can be used at the time of executing the calculation processing of the vibration $R_T$ of the support structure 104. More accurate $R_T$ and $H_p$ can therefore be calculated. By repeating (iteratively executing) this processing, $R_T$ and $H_p$ can come close to correct values.

The fluctuation calculation unit 207 performs iterative execution until a preset condition is satisfied. In this case, the change amounts of $R_T$ and $H_p$ are recorded for each iteration, and when each change amount becomes lower than a predetermined threshold, the fluctuation calculation unit 207 aborts the iterative execution. That is, when the difference between a correction value derived in preceding iterative execution and a correction value derived in current iterative execution becomes equal to or smaller than a predetermined threshold, the iterative execution is aborted. The abortion condition is not limited to this. For example, the iteration may be aborted upon the lapse of a predetermined time after the start of iterative execution.

Note that the vibration $R_T$ of the support structure 104 and the temporal fluctuation $H_p$ of projected light are calculated in the order named in the above description, but may be calculated in a reverse order. Since $R_T$ has not been calculated yet at the time of first execution, iterative processing is performed using $H_{vt}$ as a unit matrix.

A three-dimensional coordinate calculation unit 208 (coordinate calculation unit) corrects the vibration of the support structure 104 and the temporal fluctuation of projected light by using $R_T$ and $H_p$ sent from the fluctuation calculation unit 207, and calculates the three-dimensional coordinate of the target object 106. In the first embodiment, the control unit 103 implements the function of the three-dimensional coordinate calculation unit 208.

The three-dimensional coordinate calculation unit 208 receives the projection coordinate and image coordinate of the target object 106 from the image processing unit 205, the fluctuation amounts $R_T$ and $H_p$ from the fluctuation calculation unit 207, and calibration values from the parameter storage unit 206. $R_p$ is a three-dimensional translation/rotation amount from the origin of the measurement area to the optical center of the projection device 101. $R_c$ is a three-dimensional translation/rotation amount from the origin of the measurement area to the optical center of the image capturing device 102. The three-dimensional coordinate calculation unit 208 reflects the vibration $R_T$ of the support structure 104 in the three-dimensional translation/rotation amounts from the origin of the measurement area to the optical centers of the projection device 101 and image capturing device 102. More specifically, new three-dimensional translation/rotation amounts $R'_p$ and $R'_c$ are calculated by:

$$R'_p = R_T \cdot R_p$$
$$R'^c = R_T \cdot R_c \quad (10)$$

where R is the matrix R=(r|t) representing a 3×4 three-dimensional transform, r is a 3×3 rotation component, and t is a 3×1 translation component. The product of $R_1$ and $R_2$ is defined by:

$$R_3 = (r_3|t_3) = R_1 \cdot R_2$$
$$r_3 = r_1 r_2$$
$$t_3 = t_1 + r_1 t_2 \quad (11)$$

After that, the influence of the temporal fluctuation of projected light is corrected using the homography $H_p$. Letting $u_i$ be a projection coordinate, a corrected projection coordinate $u'_i$ can be obtained by:

$$\lambda_i = \begin{pmatrix} u'_i \\ 0 \\ 1 \end{pmatrix} = H_p \begin{pmatrix} u_i \\ 0 \\ 1 \end{pmatrix} \quad (12)$$

where i=1, 2, . . . , $N_m$, $N_m$ is the total number of sample points on the target object 106, and $\lambda_i$ is a scaling coefficient and is not used in subsequent processing.

Letting $P'_P$ and $P'_C$ be the projection matrices of the projection device 101 and image capturing device 102, $P'_P = R'_p$ and $P'_C = R'_c$. Letting $M_i = (X_i, Y_i, Z_i)T$ be a three-dimensional coordinate to be obtained, it can be calculated as $M_i = A_i^{-1} B_i$, in which $A_i$ and $B_i$ are matrices defined by:

$$A_i = \begin{pmatrix} x_i p_{c31} - p'_{c11} & x_i p'_{c32} - p'_{c12} & x_i p'_{c33} - p'_{c13} \\ y_i p_{c31} - p'_{c21} & y_i p'_{c32} - p'_{c22} & y_i p'_{c33} - p'_{c23} \\ u'_i p_{p31} - p'_{p11} & u'_i p'_{p32} - p'_{p12} & u'_i p'_{p33} - p'_{p13} \end{pmatrix} \quad (13)$$

$$B_i = \begin{pmatrix} p'_{c14} - x_{vk0} p'_{c34} \\ p'_{c24} - y_{vk0} p'_{c34} \\ p'_{p14} - u'_{pk0} p'_{p34} \end{pmatrix}$$

where $p'_{cij}$ and $p'_{pij}$ are the respective components of the matrices $P'_p$ and $P'_c$.

The three-dimensional coordinate calculation unit 208 sends $N_m$ three-dimensional coordinates calculated based on equations (13) to a result output unit 209.

The result output unit 209 outputs the three-dimensional coordinate of the target object 106 that has been calculated by the three-dimensional coordinate calculation unit 208. The output destination is, for example, a display device, another computer, or an auxiliary storage device connected to the control unit 103. The control unit 103 implements the function of the result output unit 209.

The control unit 210 controls the overall operation of the three-dimensional shape measurement apparatus 100. More specifically, the control unit 210 performs control of synchronizing projection of pattern light by the projection device 101 with image capturing of the image capturing device 102, and control of the timing to cause each functional element to perform a predetermined operation. In the first embodiment, the control unit 103 implements the function of the control unit 210.

<3. Operation of Apparatus>

Figure 5:
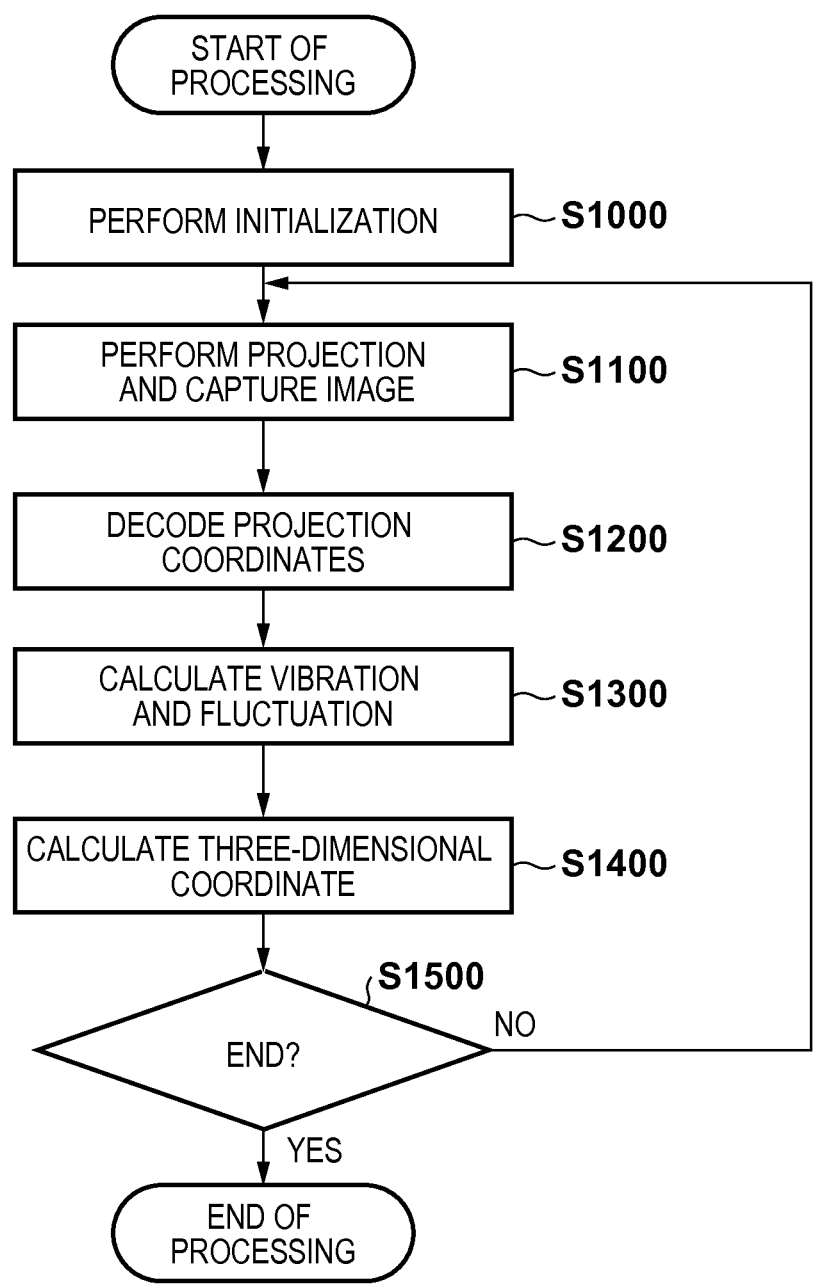
FIG. 5 is a flowchart showing the operation of the three-dimensional shape measurement apparatus according to the first embodiment.

FIG. 5 is a flowchart showing the operation of the three-dimensional shape measurement apparatus according to the first embodiment. First, when the apparatus is activated, step S1000 starts.

In step S1000, initialization processing is performed. The initialization processing includes processing of measuring $R_T$ and $H_p$ at reference time and holding them in the parameter storage unit 206. Processing of holding the image coordinate $(x_{vk0}, y_{vk0})$, the projection coordinate $(u_{pk}, v_{pk})$, and $u_{pk0}$ at reference time in the parameter storage unit 206 is also performed at this stage. For example, when the number of types of pattern images is small, it is preferable to generate all pattern images by the projection pattern generation unit 202 and hold them in the parameter storage unit 206.

In step S1100, the projection pattern generation unit 202 generates a projection pattern, and the projection unit 201 projects it as pattern light. At the same time, the image capturing unit 203 captures an image of the target object 106 to which the pattern light has been projected, and the image input unit 204 holds the image. This processing is repeated until a necessary number of pattern images are projected and image capturing is completed. The necessary number changes depending on requirements such as the method, resolution, and accuracy used in three-dimensional measurement.

In step S1200, the image processing unit 205 decodes projection coordinates by using the captured images, and associates the image coordinates with the projection coordinates.

Figure 8:
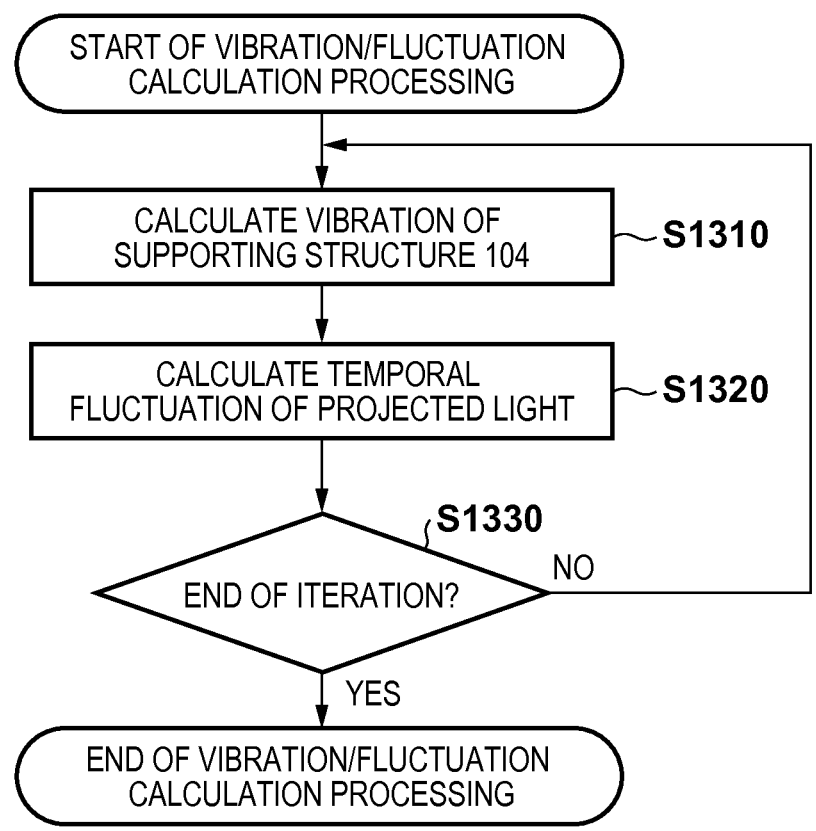
FIG. 8 is a flowchart showing details of vibration/fluctuation correction processing according to the first embodiment.

In step S1300, the fluctuation calculation unit 207 calculates the vibration of the support structure 104 and the temporal fluctuation of projected light. FIG. 8 is a flowchart showing details of vibration/fluctuation correction processing (S1300) according to the first embodiment.

In step S1310, the fluctuation calculation unit 207 calculates the vibration of the support structure 104. In step S1320, the fluctuation calculation unit 207 calculates the temporal fluctuation of projected light. In step S1330, the fluctuation calculation unit 207 determines whether a preset iteration end condition has been satisfied. If the condition has been satisfied, the internal processing ends, and the process advances to step S1400. If the condition has not been satisfied, the process returns to step S1310.

In step S1400, the three-dimensional coordinate calculation unit 208 calculates the three-dimensional coordinate of the target object 106. In step S1500, the apparatus ends the operation based on an instruction from the user. Alternatively, the process returns to step S1100. As described above, the three-dimensional shape measurement apparatus according to the first embodiment can detect and correct both the vibration of the support structure 104 and the temporal fluctuation of projected light. In particular, the three-dimensional shape measurement apparatus can obtain the three-dimensional coordinate of the target object 106 with high accuracy by performing iterative calculation using the reference markers 107 arranged on the target object support structure 105 and the projection markers 108 projected from the projection device 101 onto the target object support structure 105.

Second Embodiment

The second embodiment will be described by exemplifying a three-dimensional shape measurement apparatus using stereoscopic reference markers instead of the projection markers in the first embodiment. In the following description, only a difference from the first embodiment will be explained.

<1. Apparatus Arrangement>

Figure 6:
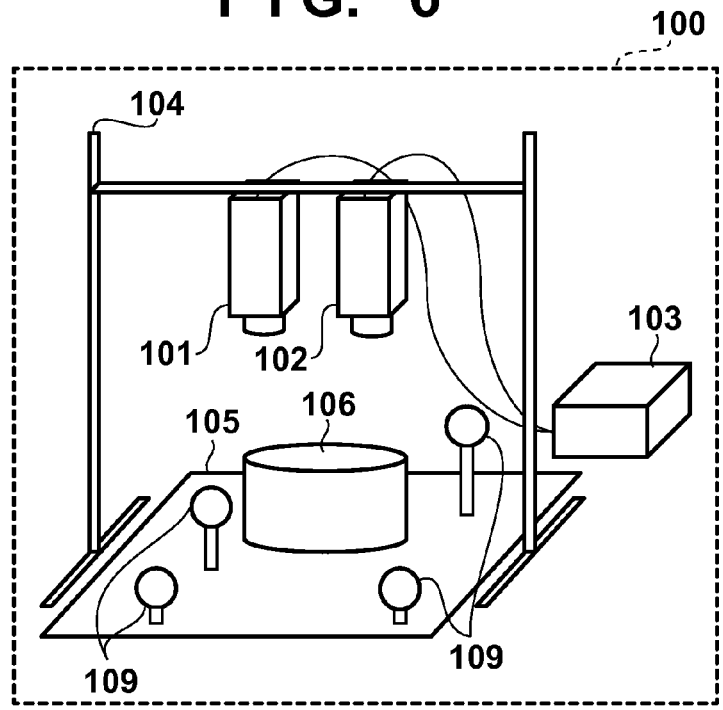
FIG. 6 is a view schematically showing the overall arrangement of a three-dimensional shape measurement apparatus according to the second embodiment.

FIG. 6 is a view schematically showing the overall arrangement of the three-dimensional shape measurement apparatus according to the second embodiment. A three-dimensional shape measurement apparatus 100 includes a projection device 101, an image capturing device 102, a control unit 103, a support structure 104, and a target object support structure 105. The three-dimensional shape measurement apparatus 100 measures the three-dimensional coordinate of a target object 106 arranged on the target object support structure 105. Unlike the first embodiment, there is no projection marker 108. Reference stereoscopic markers 109 each having a stereoscopic shape are arranged instead of the reference markers 107. The reference stereoscopic markers 109 are used to detect the vibration of the support structure 104 and the temporal fluctuation of projected light.

The plurality of reference stereoscopic markers 109 are arranged near the target object 106, and have a specific stereoscopic shape. The reference stereoscopic marker 109 has a spherical shape here, but may take another shape. The reference stereoscopic markers 109 are arranged so that none of them exist on the same plane.

The functional block arrangement is the same as the arrangement described in the first embodiment (FIG. 2), but the operations of the functional blocks are partially different. As for details of the functional elements, a difference from the first embodiment will be explained.

A projection pattern generation unit 202 generates a pattern image and sends it to a projection unit 201. For example, the projection pattern generation unit 202 generates an image for projecting pattern light necessary to implement a conventional method such as binary or Gray code structured light or the phase shift method. Since the first embodiment uses only the lateral component $u_i$ out of the projection coordinate, it suffices to project a striped pattern image only in the longitudinal direction. However, the second embodiment also uses the longitudinal component $v_i$ of the projection coordinate. Thus, the projection pattern generation unit 202 also generates a striped pattern image in the lateral direction (that is, perpendicular direction) in addition to one in the longitudinal direction, and sends it to the projection unit 201. As described above, unlike the first embodiment, the projection pattern generation unit 202 does not generate the image of the projection marker 108.

An image processing unit 205 performs region extraction processing of the reference stereoscopic markers 109, but does not perform region extraction processing of the projection markers 108. A fluctuation calculation unit 207 calculates the temporal fluctuation of projected light.

<2. Arrangement of Fluctuation Calculation Unit 207>

In the second embodiment, the fluctuation calculation unit 207 detects only the temporal fluctuation of projected light, and does not calculate the vibration of the support structure 104. A three-dimensional coordinate calculation unit 208 calculates the vibration of the support structure 104. The control unit 103 implements the function of the fluctuation calculation unit 207.

The image processing unit 205 has already performed decoding processing of pattern light projected on the surface of the reference stereoscopic markers 109. For each point on the reference stereoscopic marker 109, the correspondence between the image coordinate $(x_{vkt}, y_{vkt})$ and the projection coordinate $(u_{pkt}, v_{pkt})$ at time t has been obtained, where k=1, 2, . . . , $N_m$, and $N_m$ is the total number of sample points on the reference stereoscopic markers 109. Based on the correspondence, the fluctuation calculation unit 207 calculates a fundamental matrix F satisfying the condition of equation (14):

$$(u_{pkt}, v_{pkt}, 1)^T F (x_{vkt}, y_{vkt}, 1) = 0 \quad (14)$$

Although there are a plurality of known methods as the method of obtaining the fundamental matrix F, the fundamental matrix F can be calculated using the method described in literature A mentioned above. The fluctuation calculation unit 207 sends the calculated fundamental matrix F as the temporal fluctuation amount of projected light to the three-dimensional coordinate calculation unit 208.

Note that the image coordinate $(x_{vkt}, y_{vkt})$ and the projection coordinate $(u_{pkt}, v_{pkt})$ are influenced by both the temporal fluctuation of projected light and the vibration of the support structure 104. The fundamental matrix F represents only the relation between the projection device 101 and the image capturing device 102 and is independent of the influence of the vibration of the support structure 104. That is, the temporal change of the fundamental matrix F directly expresses the temporal fluctuation amount of projected light.

The three-dimensional coordinate calculation unit 208 calculates a projection matrix $P_P$ of the projection device 101 by using the fundamental matrix F sent from the fluctuation calculation unit 207. This calculation can be implemented using a method described in, for example, "Koichiro Deguchi, Fundamentals of Robot Vision, Corona Publishing, 2000" (literature B). For the above-described reason, calculating a three-dimensional coordinate using $P_p$ is equivalent to correcting the temporal fluctuation of projected light. A projection matrix $P_c$ of the image capturing device 102 is obtained by calculation described in the first embodiment, and always takes the same value during processing.

Then, the three-dimensional coordinate calculation unit 208 calculates the three-dimensional coordinate $M_{ckt}$ of the reference stereoscopic marker 109=$(X_{vkt}, Y_{vkt}, Z_{vkt})$ as $M_{vkt} = A_{vkt}^+ B_{vkt}$, where $A_{vkt}$ and $B_{vkt}$ are matrices defined by equations (15):

$$A_{vkt} = \begin{pmatrix} x_{vkt}p_{c_{31}} - p_{c_{11}} & x_{vkt}p_{c_{32}} - p_{c_{12}} & x_{vkt}p_{c_{33}} - p_{c_{13}} \\ y_{vkt}p_{c_{31}} - p_{c_{21}} & y_{vkt}p_{c_{32}} - p_{c_{22}} & y_{vkt}p_{c_{33}} - p_{c_{23}} \\ u'_{pkt}p_{p_{31}} - p_{p_{11}} & u'_{pkt}p_{p_{32}} - p_{p_{12}} & u'_{pkt}p_{p_{31}} - p_{p_{13}} \\ v'_{pkt}p_{p_{31}} - p_{p_{21}} & v'_{pkt}p_{p_{32}} - p_{p_{22}} & v'_{pkt}p_{p_{33}} - p_{p_{23}} \end{pmatrix} \quad (15)$$

$$B_{vkt} = \begin{pmatrix} p_{c_{14}} - x_{vkt}p_{c_{34}} \\ p_{c_{24}} - y_{vkt}p_{c_{34}} \\ p_{p_{14}} - u'_{pkt}p_{p_{34}} \\ p_{p_{24}} - v'_{pkt}p_{p_{34}} \end{pmatrix}$$

where $A^+$ is a Moore-Penrose pseudo-inverse matrix, and $P_{cij}$ and $p_{pij}$ are the components of the matrices $P_p$ and $P_c$.

At reference time t=0, the fluctuation calculation unit 207 sends a reference image coordinate $(x_{vk0}, y_{vk0})$ and a reference three-dimensional coordinate $M_{vk0}$ to a parameter storage unit 206, and the parameter storage unit 206 holds them. At other times, these values are read out from the parameter storage unit 206.

Owing to the vibration of the support structure 104, the image coordinate and the projection coordinate change over time. $(x_{vkt}, y_{vkt})$, $u_{pkt}$, and $(X_{vkt}, Y_{vkt}, Z_{vkt})$ are the image coordinate and projection coordinate at time t, and a corresponding three-dimensional coordinate, respectively. At this time, the three-dimensional coordinate $M_{vkt}$ on the reference stereoscopic marker 109 is defined as $M_{vkt}=(X_{vkt}, Y_{vkt}, Z_{vkt}, 1)$ using a homogeneous coordinate, and the temporal change of $M_{vkt}$ can be regarded as the vibration of the support structure 104. $M_t=(M_{v1t}^T, M_{v2t}^T, \ldots, M_{vmt}^T)$ is a set of three-dimensional coordinates at time t. In this case, three-dimensional transform between time t=0 and time t=T is represented as a 4×4 matrix $R'_T$, and can be directly calculated by $R'_T = M_T M_0^{-1}$.

$P'_P$ and $P'_C$ are projection matrixes obtained by correcting the vibrations $R_T$ of the projection device 101 and image capturing device 102, and can be calculated by:

$$P'_p = P_p \cdot R'_T$$

$$P'_c = P_c \cdot R'_T \qquad (16)$$

Letting $M_i=(X_i, Y_i, Z_i)$ be a three-dimensional coordinate to be obtained, the three-dimensional coordinate can be calculated as $M_i = A_i^{-1} B_i$, in which $A_i$ and $B_i$ are matrices defined by equations (13). Also, i=1, 2, . . . , $N_m$, and $N_m$ is the total number of sample points on the target object 106.

In the second embodiment, the fundamental matrix F is calculated without the influence of the vibration of the support structure 104. Unlike the first embodiment, calculation need not be performed repetitively. The three-dimensional coordinate calculation unit 208 sends $N_m$ three-dimensional coordinates calculated based on equations (13) to a result output unit 209.

<3. Operation of Apparatus>

Figure 9:
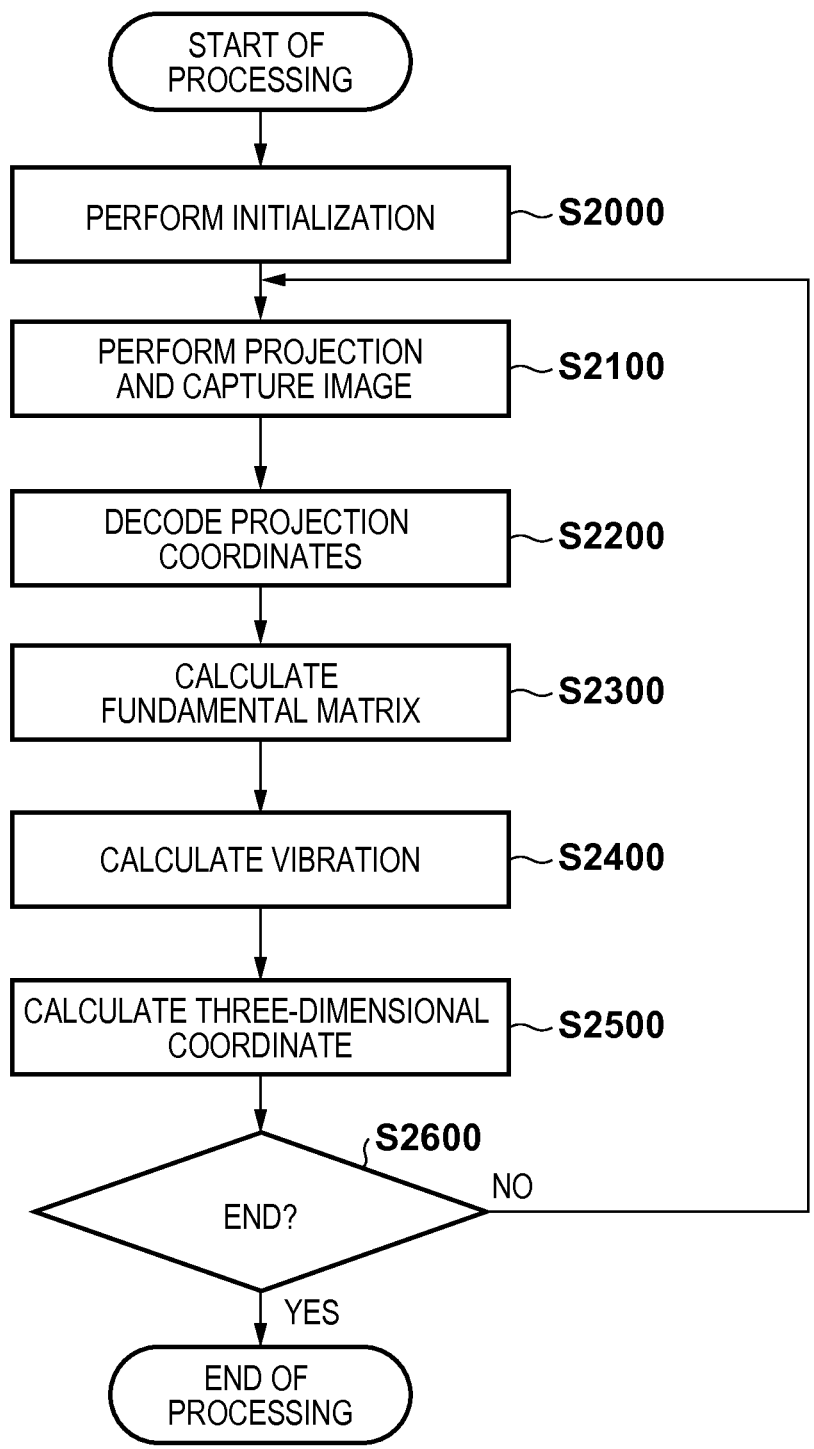
FIG. 9 is a flowchart showing details of vibration/fluctuation correction processing according to the second embodiment.

FIG. 9 is a flowchart showing details of vibration/fluctuation correction processing according to the second embodiment. First, when the apparatus is activated, step S2000 starts.

In step S2000, initialization processing is performed. The initialization processing in step S2000 includes processing of measuring $R_T$ and $H_p$ at reference time and holding them in the parameter storage unit 206. Processing of holding the image coordinate $(x_{vk0}, y_{vk0})$ at reference time in the parameter storage unit 206 is also performed at this stage. When types of pattern images are limited, the projection pattern generation unit 202 generates all pattern images at this time, and the parameter storage unit 206 holds them.

In step S2100, the projection pattern generation unit 202 generates a projection pattern, and the projection unit 201 projects it as pattern light. At the same time, the image capturing unit 203 captures an image of the target object 106 to which the pattern light has been projected, and an image input unit 204 holds the image. This processing is repeated until a necessary number of pattern images are projected and image capturing is completed. The necessary number changes depending on requirements such as the method, resolution, and accuracy used in three-dimensional measurement.

In step S2200, the image processing unit 205 decodes projection coordinates by using the captured images, and associates the image coordinates with the projection coordinates.

In step S2300, the fluctuation calculation unit 207 calculates the fundamental matrix F by using the associated image coordinate and projection coordinate. In step S2400, the fluctuation calculation unit 207 calculates the vibration of the support structure 104.

In step S2500, the three-dimensional coordinate calculation unit 208 calculates the three-dimensional coordinate of the target object 106. In step S2600, the apparatus ends the three-dimensional shape measurement processing based on an instruction from the user. Alternatively, the process returns to step S2100.

As described above, the three-dimensional shape measurement apparatus according to the second embodiment can detect and correct both the vibration of the support structure 104 and the temporal fluctuation of projected light. In particular, the three-dimensional shape measurement apparatus can obtain the three-dimensional coordinate of the target object 106 with high accuracy by using the reference stereoscopic markers 109 arranged on the target object support structure 105 without performing iterative calculation.

Third Embodiment

The third embodiment will be described by exemplifying a three-dimensional shape measurement apparatus in a form in which both a projection device 101 and an image capturing device 102 are installed on a robot hand 110.

Even in a situation in which the vibration of the robot hand 110 can be accurately measured, the geometric relation between the robot hand 110, the projection device 101, and the image capturing device 102 may fluctuate owing to the vibration of the robot hand 110 to decrease the measurement accuracy of a three-dimensional coordinate. In such a case, a structure that fixes the robot hand 110 and the projection device 101 and image capturing device 102 generates a vibration different from that of the robot hand 110. Thus, even if the measured values of the position and orientation of the robot hand 110 are used for triangulation, no three-dimensional coordinate can be calculated with high accuracy. Even in this case, the third embodiment can calculate the fluctuation of the geometric relation and obtain the three-dimensional coordinate of a target object 106 with high accuracy.

<1. Apparatus Arrangement>

Figure 7:
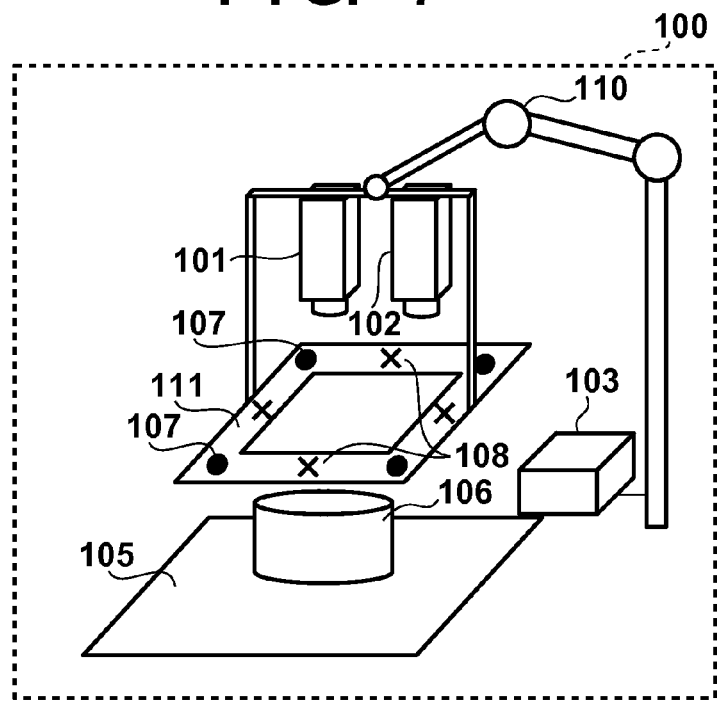
FIG. 7 is a view schematically showing the overall arrangement of a three-dimensional shape measurement apparatus according to the third embodiment.

FIG. 7 is a view schematically showing the overall arrangement of the three-dimensional shape measurement apparatus according to the third embodiment. A three-dimensional shape measurement apparatus 100 includes the projection device 101, the image capturing device 102, a control unit 103, a target object support structure 105, the robot hand 110, and a marker support structure 111. The three-dimensional shape measurement apparatus 100 measures the three-dimensional coordinate of a target object 106 arranged on the target object support structure 105. Unlike the first embodiment, the robot hand 110 functions as the support structure 104, and reference markers 107 and projection markers 108 are set or projected on the marker support structure 111.

The robot hand 110 can take an arbitrary position and orientation within the range of its movable region. The control unit 103 controls this operation. The position and orientation of the robot hand 110 are always observed by an internally installed encoder, and are sent to the control unit 103. The projection device 101, the image capturing device 102, and the marker support structure 111 are fixed on the arm of the robot hand 110, and the robot hand 110 integrally controls their positions and orientations.

The marker support structure 111 (marker support structure) is fixed to the robot hand 110, and the plurality of reference markers 107 are arranged on the marker support structure 111. The projection device 101 projects the projection markers 108 onto the marker support structure 111. A hole enough not to hinder projection of pattern light by the projection device 101 or image capturing of the target object 106 by the image capturing device 102 is formed at the center of the marker support structure 111. Pattern light traveling from the projection device 101 always illuminates both the reference markers 107 and the target object 106. The image capturing device 102 always captures images of both the reference markers 107 and target object 106.

The marker support structure 111 is fixed to the robot hand 110. Thus, the geometric relation between the projection device 101, the image capturing device 102, the reference markers 107, and the projection markers 108 changes only under the influence of the vibration of the robot hand 110 and the temporal fluctuation of projected light of the projection device 101.

A three-dimensional coordinate calculation unit 208 corrects the vibration of the support structure 104 and the temporal fluctuation of projected light by using $R_T$ and $H_p$ sent from a fluctuation calculation unit 207, and calculates the three-dimensional coordinate of the target object 106. The control unit 103 implements the function of the three-dimensional coordinate calculation unit 208.

<2. Arrangement of Three-Dimensional Coordinate Calculation Unit 208>

The three-dimensional coordinate calculation unit 208 receives a pair of the projection coordinate and image coordinate of the target object 106 from an image processing unit 205, and calculates the three-dimensional coordinate of the target object 106. The three-dimensional coordinate calculation unit 208 receives fluctuation amounts $R_T$ and $H_p$ from the fluctuation calculation unit 207, the position and orientation of the robot hand 110 from a control unit 210, and calibration values from a parameter storage unit 206.

$A_p$ is the internal parameter of the projection device 101. $R_p$ is a three-dimensional translation/rotation amount from the origin of the measurement area to the optical center of the projection device 101. $A_c$ is the internal parameter of the image capturing device 102. $R_c$ is a three-dimensional translation/rotation amount from the origin of the measurement area to the optical center of the image capturing device 102. $R_A$ is the position and orientation of the robot hand 110. In this case, the three-dimensional coordinate calculation unit 208 reflects the position and orientation of the robot hand 110 and the vibration $R_T$ of the support structure 104 in the three-dimensional translation/rotation amounts from the origin of the measurement area to the optical centers of the projection device 101 and image capturing device 102. More specifically, new three-dimensional translation/rotation amounts $R'_p$ and $R'_c$ are calculated by:

$$R'_p = R_A \cdot R_T \cdot R_p$$

$$R'_c = R_A \cdot R_T \cdot R_c \quad (17)$$

The temporal fluctuation of projected light is corrected using the obtained $R'_p$ and $R'_c$ based on equation (12) as in the first embodiment. The three-dimensional coordinate of the target object 106 is calculated based on equations (13).

The control unit 210 controls the overall operation of the three-dimensional shape measurement apparatus 100. More specifically, the control unit 210 performs control for arranging the robot hand 110 at a predetermined position and orientation, and control of receiving the current position and orientation of the robot hand 110. The control unit 210 also performs control of synchronizing projection of pattern light by the projection device 101 with image capturing of the image capturing device 102, and control of the timing to cause each functional element to perform a predetermined operation. The control unit 103 implements the function of the control unit 210.

<3. Operation of Apparatus>

Figure 10:
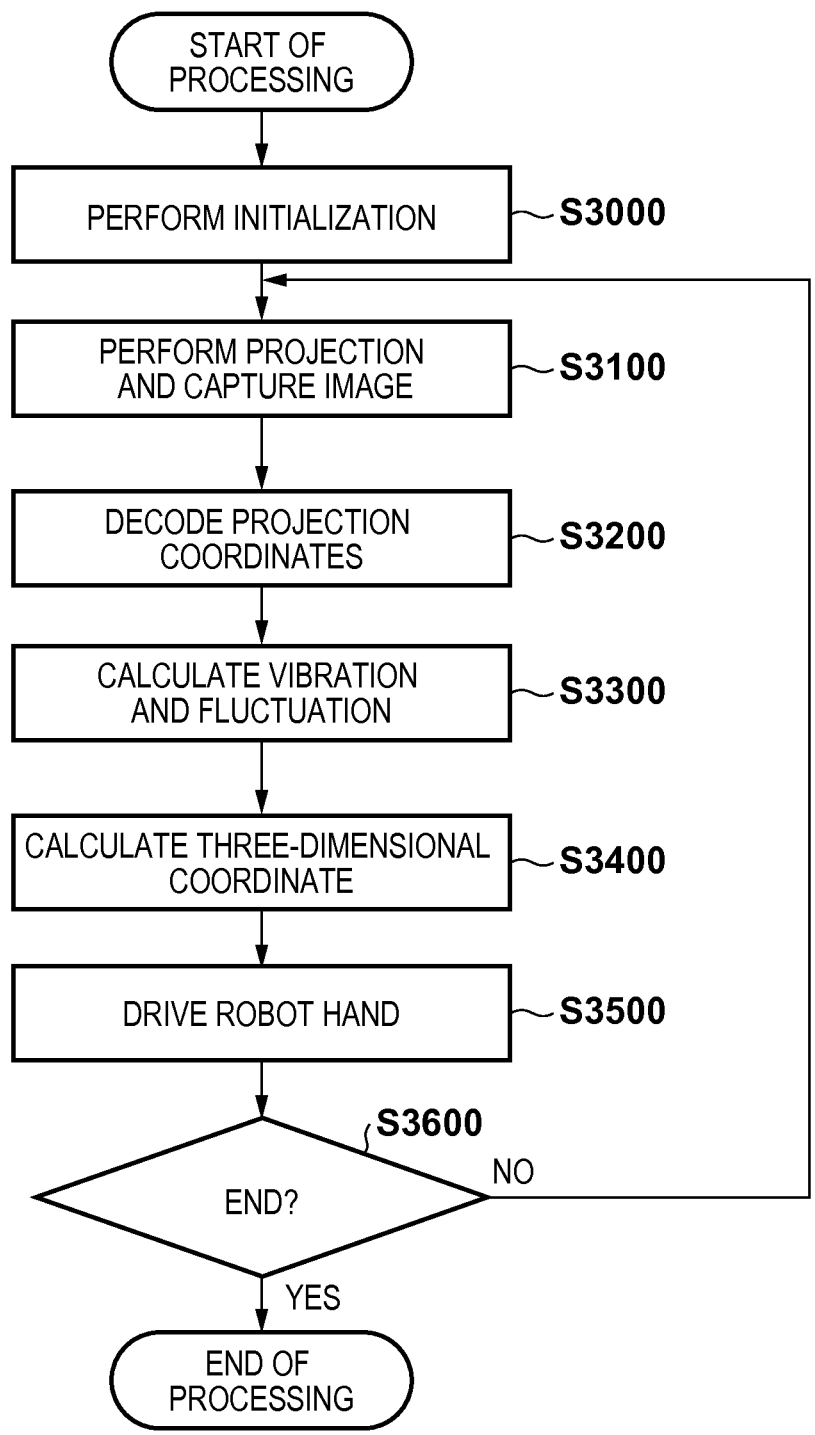
FIG. 10 is a flowchart showing details of vibration/fluctuation correction processing according to the third embodiment.

FIG. 10 is a flowchart showing details of vibration/fluctuation correction processing according to the third embodiment. First, when the apparatus is activated, step S3000 starts.

In step S3000, initialization processing is performed. The initialization processing in step S3000 includes processing of measuring $R_T$ and $H_p$ at reference time and holding them in the parameter storage unit 206. Processing of holding the image coordinate $(x_{vk0}, y_{vk0})$, the projection coordinate $(u_{pk}, v_{pk})$, and $u_{pk0}$ at reference time in the parameter storage unit 206 is also performed at this stage. When types of pattern images are limited, a projection pattern generation unit 202 generates all pattern images at this time, and the parameter storage unit 206 holds them.

In step S3100, the projection pattern generation unit 202 generates a projection pattern, and a projection unit 201 projects it as pattern light. At the same time, an image capturing unit 203 captures an image of the target object 106 to which the pattern light has been projected, and an image input unit 204 holds the image. This processing is repeated until a necessary number of pattern images are projected and image capturing is completed. The necessary number changes depending on requirements such as the method, resolution, and accuracy used in three-dimensional measurement.

In step S3200, the image processing unit 205 decodes projection coordinates by using the captured images, and associates the image coordinates with the projection coordinates.

In step S3300, the fluctuation calculation unit 207 calculates the vibration of the support structure 104 and the temporal fluctuation of projected light. In step S3400, the three-dimensional coordinate calculation unit 208 calculates the three-dimensional coordinate of the target object 106. In step S3500, the control unit 103 sends a control instruction to the robot hand 110 to operate the robot hand 110 to a desired position and orientation. In step S3600, the apparatus ends the operation based on an instruction from the user. Alternatively, the process returns to step S3100.

As described above, according to the third embodiment, the vibration of the robot hand and the temporal fluctuation of projected light can be calculated to obtain the three-dimensional coordinate of the target object 106 with high accuracy. Even if the geometric relation between the robot hand 110, the projection device 101, and the image capturing device 102 fluctuates owing to a vibration, this fluctuation can be calculated to obtain the three-dimensional coordinate of the target object 106 with high accuracy.

Fourth Embodiment

The fourth embodiment will be described by exemplifying a three-dimensional shape measurement apparatus using a calibration object which is arranged at the assumed arrangement position of a target object and has a known three-dimensional coordinate. In the following description, only a difference from the first embodiment will be explained.

<1. Apparatus Arrangement>

Figure 11:
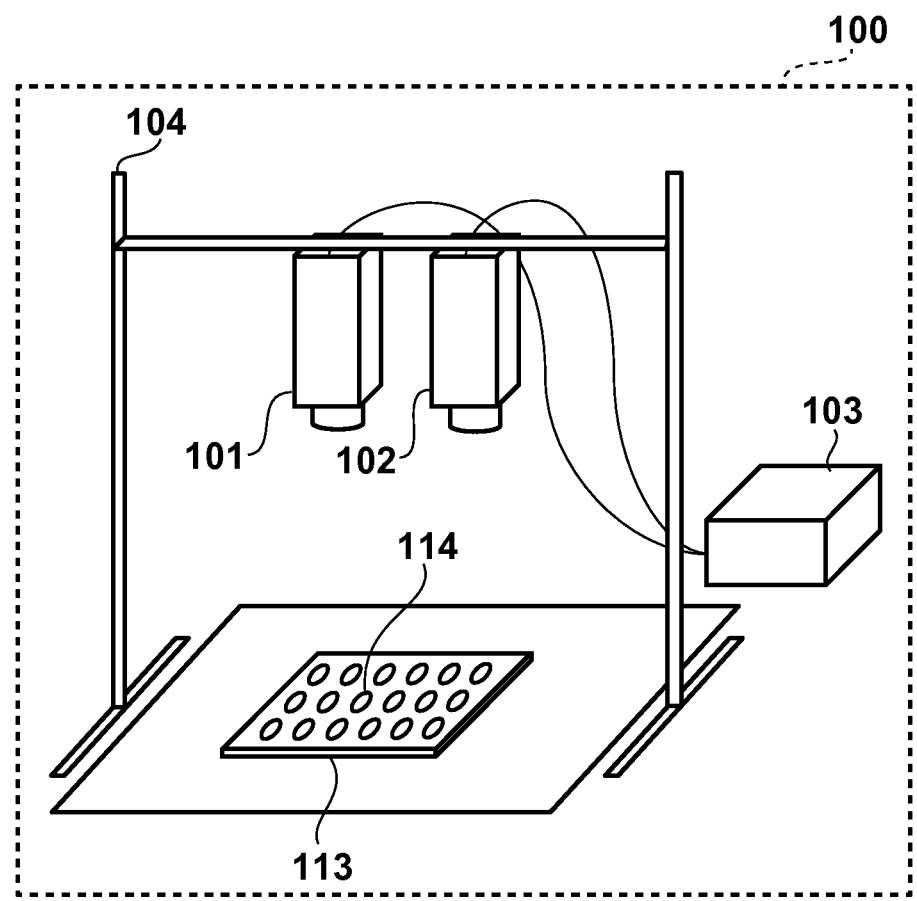
FIG. 11 is a view schematically showing the overall arrangement of a three-dimensional shape measurement apparatus according to the fourth embodiment.

FIG. 11 is a view schematically showing the overall arrangement of the three-dimensional shape measurement apparatus according to the fourth embodiment. A three-dimensional shape measurement apparatus 100 includes a projection device 101, an image capturing device 102, a control unit 103, a support structure 104, and a target object support structure 105, as in the first embodiment. A calibration object 113 is arranged on the target object support structure 105 and measured by the three-dimensional shape measurement apparatus 100 to calibrate the three-dimensional shape measurement apparatus 100.

The projection device 101, the image capturing device 102, the support structure 104, and the target object support structure 105 have the same functions as those in the first embodiment. The control unit 103 controls processing necessary to calibrate the three-dimensional shape measurement apparatus 100.

The calibration object 113 is formed from, for example, a flat plate on which a plurality of calibration markers 114 are arranged on the surface. This flat plate is manufactured by a material and method capable of ensuring very high flatness. The calibration object 113 ensures accuracy with which the three-dimensional coordinates of the calibration markers 114 can be regarded as known ones in a coordinate system defined inside the calibration object 113. Assume that the calibration markers 114 are perfect circles arranged at equal intervals, and the three-dimensional coordinate of the center of each circle has been known. Note that the calibration markers 114 need not always be perfect circles. For example, double circles, ellipses, a checkered pattern, or another arbitrary pattern is usable. As for the shape, the entire calibration object 113 need not always be flat, and an object of an arbitrary shape locally having a flat surface, such as a rectangular parallelepiped or a cube, can be used. The calibration object 113 and the calibration markers 114 are arbitrary as long as a three-dimensional coordinate regarded as a true value in a coordinate system defined inside the calibration object 113 can be physically provided for measurement accuracy implementable by the three-dimensional shape measurement apparatus 100.

Figure 12:
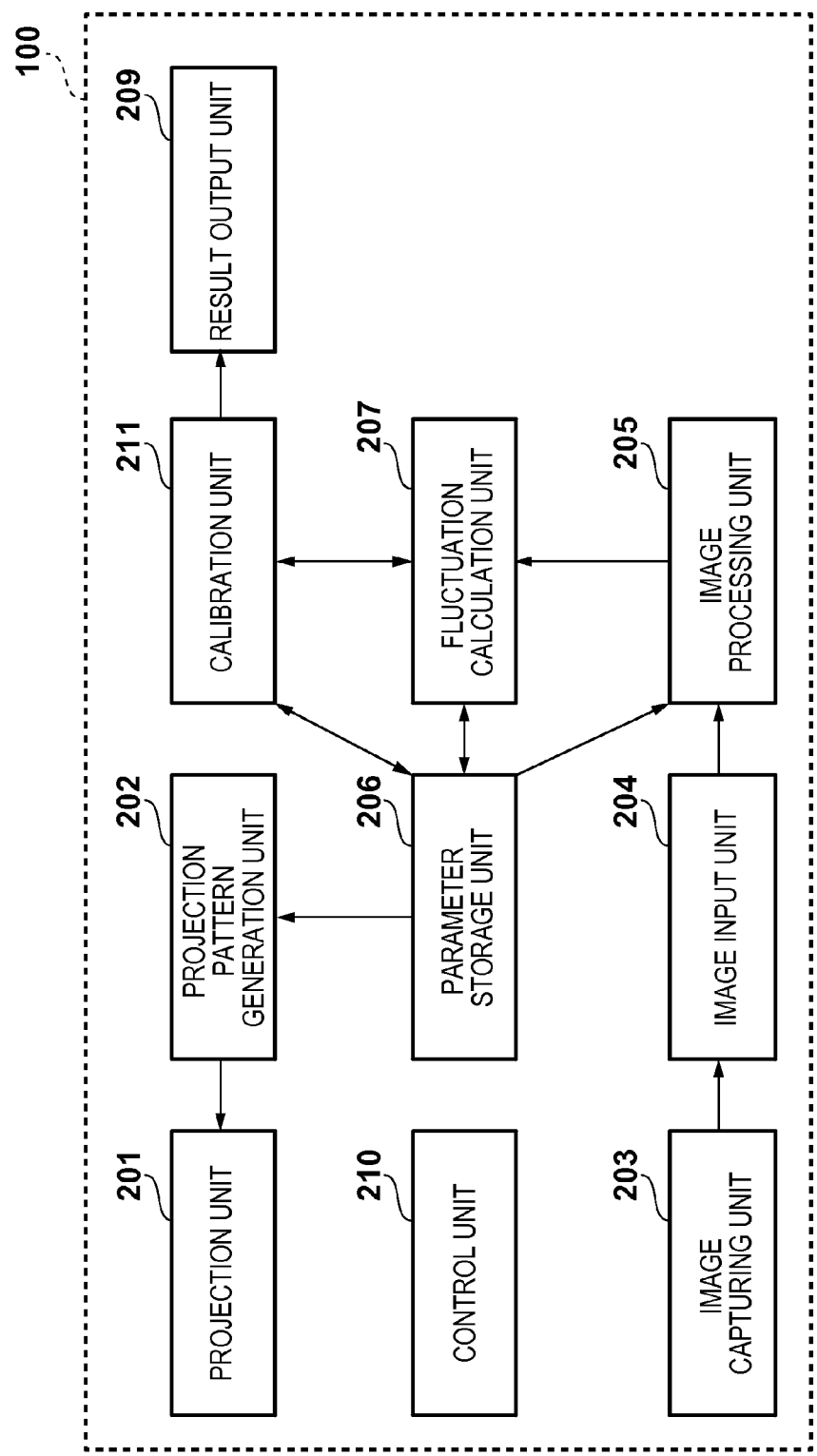
FIG. 12 is a functional block diagram showing the three-dimensional shape measurement apparatus according to the fourth embodiment.

FIG. 12 is a functional block diagram showing the three-dimensional shape measurement apparatus according to the fourth embodiment.

A projection unit 201, an image capturing unit 203, an image input unit 204, a parameter storage unit 206, and a control unit 210 are the same as those in the first embodiment.

A projection pattern generation unit 202 generates a pattern image and sends it to the projection unit 201. For example, the projection pattern generation unit 202 generates an image for projecting pattern light necessary to implement a conventional method such as binary or Gray code structured light or the phase shift method. Since the first embodiment uses only the lateral component $u_i$ out of the projection coordinate, it suffices to project a striped pattern image only in the longitudinal direction. However, the longitudinal component $v_i$ of the projection coordinate is also used here. Thus, the projection pattern generation unit 202 also generates a striped pattern image in the lateral direction in addition to one in the longitudinal direction, and sends it to the projection unit 201. Unlike the first embodiment, the projection pattern generation unit 202 does not generate the image of the projection marker 108.

An image processing unit 205 receives a captured image from the image input unit 204 and performs necessary image processing. The image processing to be performed by the image processing unit 205 includes extraction processing of the calibration markers 114, and decoding processing of pattern light included in an image.

The image processing unit 205 performs extraction processing of the calibration markers 114 by using an image input from the image processing unit 205. This extraction processing associates, via the calibration markers 114, the pixels of the image captured by the image capturing device 102 with three-dimensional coordinates in the coordinate system of the calibration object 113. Since the calibration markers 114 are perfect circles, the image processing unit 205 extracts the regions of circles from the image, and calculates image coordinates corresponding to the centers of the circles. The method of calculating the center of a circle in an image can be a method of estimating, from a detected edge, parameters constituting a circle, a method of detecting a barycenter by template matching, or a known arbitrary method. When the calibration markers 114 are formed from a checkered pattern or the like, an image coordinate serving as the intersection point of a grid is calculated and associated with a three-dimensional coordinate. That is, a stably detectable feature is defined in advance in accordance with the shape of the calibration markers 114, and the image processing unit 205 detects the image coordinate of the feature from an image and associates it with a three-dimensional coordinate.

The image processing unit 205 performs pattern decoding processing using a plurality of images input from the image processing unit 205. This decoding processing associates, via the calibration markers 114, the projection coordinates of a pattern image projected by the projection device 101 with three-dimensional coordinates in the coordinate system of the calibration object 113. Since the projection device 101 cannot observe an image, projection coordinates corresponding to the calibration markers 114 are associated using image coordinates in the image capturing device 102.

More specifically, the decoding processing has already associated image coordinates with projection coordinates, so projection coordinates corresponding to image coordinates that correspond to the calibration markers 114 are selected. In general, the projection device 101 and the image capturing device 102 are configured so that one pixel of the image capturing device 102 becomes smaller than one pixel of the projection device 101 on the object plane. To obtain the projection coordinates of the calibration markers 114 with high accuracy, processing of interpolating and estimating the projection coordinates by using a plurality of correspondences needs to be performed. The control unit 103 implements the function of the image processing unit 205.

A fluctuation calculation unit 207 calculates the temporal fluctuation of projected light, and modifies the projection coordinates to cancel the temporal fluctuation. The control unit 103 implements the function of the fluctuation calculation unit 207.

A calibration unit 211 performs calibration processing based on the known three-dimensional coordinates of the calibration markers 114, corresponding image coordinates, and corresponding projection coordinates modified by the fluctuation calculation unit 207. More specifically, the calibration unit 211 calculates the focal length, optical center coordinate, and lens distortion coefficient as the intrinsic parameters of each of the projection device 101 and image capturing device 102. The calibration unit 211 also calculates extrinsic parameters, that is, a parameter of three-dimensional translation/rotation between the image capturing device 102 and a coordinate system defined by the calibration object 113, and a parameter of three-dimensional translation/rotation between the projection device 101 and the image capturing device 102. These intrinsic and extrinsic parameters will be called calibration values.

In the fourth embodiment, the fluctuation calculation unit 207 does not directly calculate the vibration of the support structure 104. However, the calibration values are calculated to remove the influence of the vibration of the support structure 104 by processing of the calibration unit 211, so the same effect as the effect of correcting the vibration of the support structure 104 can be obtained.

As described above, a measured value can be obtained only depending on the temporal fluctuation of projected light and the vibration of the support structure 104. Hence, in the fourth embodiment, the fluctuation calculation unit 207 and the calibration unit 211 are configured to finally remove the influence of the interdependent fluctuation and vibration by performing calibration while correcting the influence of the other one of the fluctuation and vibration, and iteratively repeating this processing.

<2. Arrangements of Fluctuation Calculation Unit 207 and Calibration Unit 211>

The calibration unit 211 calculates calibration values on the assumption that there is neither the temporal fluctuation of projected light nor the vibration of the support structure 104. As a matter of course, the calculated calibration values include errors. However, these errors are removed in the course of processing to be described later, and it suffices to obtain rough calibration values at the first stage.

Processing of calculating calibration values is roughly divided into two. As the first stage, internal parameters, and a three-dimensional translation/rotation amount with respect to the calibration object 113 are calculated for each of the image capturing device 102 and projection device 101. Since the calibration object 113 can take a plurality of types of positions and orientations, the three-dimensional translation/rotation amount is not regarded as an external parameter. As the second stage, the three-dimensional translation/rotation amount between the image capturing device 102 and the projection device 101 is calculated using the internal parameters calculated at the first stage. This three-dimensional translation/rotation amount is an external parameter. Note that calculation of each parameter can use a known arbitrary method. For example, it is common practice to obtain an initial value based on a known geometric relation, and apply nonlinear optimization so as to minimize an error on an image projected again.

The fluctuation calculation unit 207 calculates the temporal fluctuation of projected light by using the rough calibration values. The contents of this processing will be explained in detail.

$R_{WC}$ is a matrix representing a three-dimensional translation/rotation amount from a coordinate system defined on the calibration object 113 to the image capturing device 102. $R_{CP}$ is a three-dimensional translation/rotation amount from the image capturing device 102 to the projection device 101. $R_{WC}$ and $R_{CP}$ are some of calibration values, and their rough values have already been calculated by the calibration unit 211. At this time, $R_{CP}$ includes an error arising from the vibration of the support structure 104. Also, $P_{Wj}=(X_{Wj}, Y_{Wj}, Z_{Wj})^T$ (j is a suffix for discriminating the individual calibration marker 114) is the known three-dimensional coordinate of the calibration marker 114. In this case, an original projection coordinate $p'_{pj}$ of projection at $P_{Wj}=(u'_{pj}, v'_{pj}, 1)^T$ is given by:

$$\lambda_{pj} p'_{pj} = R_{CP} \cdot R_{WC} \cdot P_{Wj} \tag{18}$$

where $\lambda_{pj}$ is the scaling coefficient and is not used in subsequent processing.

When the matrix $R_{WP}$ representing a three-dimensional translation/rotation amount from the coordinate system defined on the calibration object 113 to the projection device 101 has been calculated, equation (19) is used instead of equation (18):

$$\lambda_{pj} p'_{pj} = R_{WP} \cdot P_{Wj} \tag{19}$$

In this case, the matrix $R_{WC}$ includes an error arising from the vibration of the support structure 104.

$p_{pj}=(u_{pj}, v_{pj}, 1)^T$ is the projection coordinate of actual projection at $P_{Wj}$. Since all the three-dimensional coordinates $P_{Wj}$ exist on the same plane, the relation between $p_{pj}$ and $p'_{pj}$ can be described by homography $H_p$:

$$\lambda'_{pj} \begin{pmatrix} u'_{pj} \\ v'_{pj} \\ 1 \end{pmatrix} = H_p \begin{pmatrix} u_{pj} \\ v_{pj} \\ 1 \end{pmatrix} \tag{20}$$

The fluctuation calculation unit 207 calculates the homography $H_p$ that satisfies equation (20), and calculates $p''_{pj}$ by converting $p_{pj}$ by $H_p$ for all j. $p''_{pj}$ is a projection coordinate after modifying the temporal fluctuation of the projection device 101, and this coordinate is sent to the calibration unit 211.

Normally, the position and orientation of the calibration object 113 are changed at the time of calibration to capture images a plurality of times so as to cover the whole target measurement area. In this case, a process of obtaining the homography $H_p$ independently for every image capturing of the calibration object 113, and modifying the corresponding projection coordinate $p''_{pj}$ is repeated by the number of captured images. Also, when the calibration object 113 has a plurality of planes, the same processing is performed for each plane.

The calibration unit 211 calculates again calibration values by using $p''_{pj}$ modified by the fluctuation calculation unit 207 in place of the projection coordinate $p_{pj}$ obtained when calibration was performed for the first time. Of the calibration values, the internal parameters of the image capturing device 102 are not influenced by the temporal fluctuation of projected light and the vibration of the support structure 104, need not be calculated again, and thus internal parameters calculated in advance are used without change.

The calibration values updated by the calibration unit 211 are almost free from errors arising from the temporal fluctuation of projected light. However, $R_{WC}$ and $R_{CP}$ used to calculate the homography $H_p$ include errors arising from the vibration of the support structure 104. Since the temporal fluctuation of projected light and the vibration of the support structure 104 are interdependent, these errors have not been completely removed at this time.

Thus, the calibration unit 211 sends the updated calibration values to the fluctuation calculation unit 207. The fluctuation calculation unit 207 calculates again $H_p$ by using the updated calibration values, obtains the modified projection coordinate $p''_{pj}$, and sends it again to the calibration unit 211. The calibration unit 211 calculates again the calibration values by using the modified projection coordinate $p''_{pj}$.

Every time the iteration is repeated, the influence of the fluctuation is removed from the calibration values, and calibration values free from the errors arising from the fluctuation are finally calculated.

In the fourth embodiment, a change of the calibration values or the sum of residuals in optimization calculation is compared in every iteration. If it is determined that the change amount in every iteration is satisfactorily small, the calibration unit 211 aborts subsequent processing, and sends the latest calibration values to a result output unit 209.

The result output unit 209 outputs, in a predetermined format, the calibration values sent from the calibration unit 211. The result output unit 209 writes, in an auxiliary storage device (not shown), the calibration values as a data file described in a predetermined format.

In addition, the result output unit 209 may display, on a display device such as a display, the calibration values, the sum of residuals, the result of calculating the three-dimensional coordinates of the calibration markers 114, or the like, and prompt a user operation or determination.

<3. Operation of Apparatus>

Figure 13:
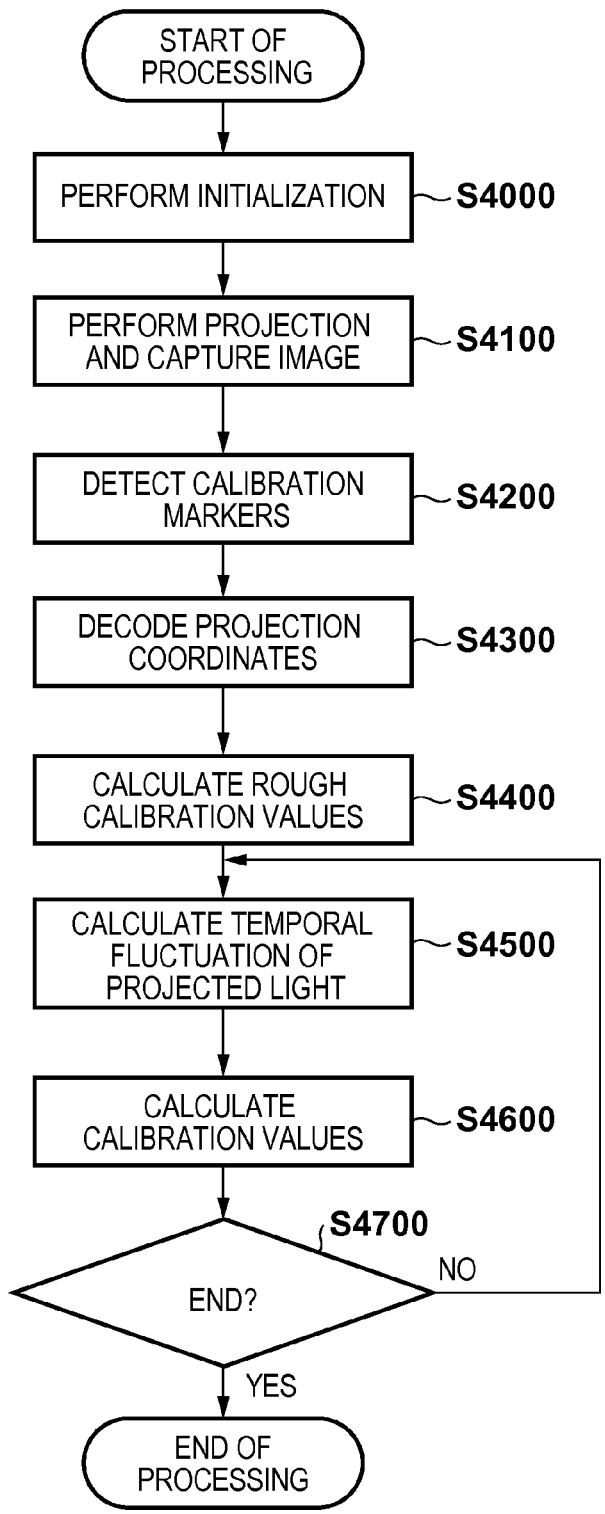
FIG. 13 is a flowchart showing the operation of the three-dimensional shape measurement apparatus according to the fourth embodiment.

FIG. 13 is a flowchart showing the operation of the three-dimensional shape measurement apparatus according to the fourth embodiment. First, when the apparatus is activated, step S4000 starts.

In step S4000, initialization processing is performed. The initialization processing in step S4000 includes processing of reading out or calculating the three-dimensional coordinates of the calibration markers 114 and holding them in the parameter storage unit 206. When the number of types of pattern images is small, the initialization processing includes, for example, processing of generating all pattern images by the projection pattern generation unit 202 at this time and holding them in the parameter storage unit 206.

In step S4100, the projection pattern generation unit 202 generates a projection pattern, and the projection unit 201 projects it as pattern light. At the same time, the image capturing unit 203 captures an image of the target object 106 to which the pattern light has been projected, and the image input unit 204 holds the image. This processing is repeated until a necessary number of pattern images are projected and image capturing is completed.

In step S4200, the image processing unit 205 extracts the calibration markers 114 from the captured image, and associates three-dimensional coordinates in the coordinate system on the calibration object 113 with image coordinates.

In step S4300, the image processing unit 205 decodes projection coordinates by using the captured images, and associates the image coordinates with the projection coordinates.

In step S4400, the calibration unit 211 calculates rough calibration values as initial values. In step S4500, the fluctuation calculation unit 207 calculates the temporal fluctuation of projected light and modifies the projection coordinates. In step S4600, the calibration unit 211 calculates updated calibration values based on the modified projection coordinates.

In step S4700, the calibration unit 211 determines whether a preset iteration end condition has been satisfied. If the condition has been satisfied, the calibration unit 211 outputs the latest calibration values, and the process ends. If the condition has not been satisfied, the process returns to step S4500.

As described above, according to the fourth embodiment, the three-dimensional shape measurement apparatus 100 can be calibrated with high accuracy by using a calibration object which is arranged at the assumed arrangement position of a target object and has a known three-dimensional coordinate. Especially when the geometric relation between the image capturing device 102 and the projection device 101 is unknown, the influence of the vibration of the three-dimensional shape measurement apparatus and the temporal fluctuation of projected light can be preferably removed.

Fifth Embodiment

The fifth embodiment will be described by exemplifying a three-dimensional shape measurement apparatus using reference plane markers that are arranged near a target object and have known three-dimensional coordinates. In the following description, only a difference from the first embodiment will be explained.

<1. Apparatus Arrangement>

Figure 14:
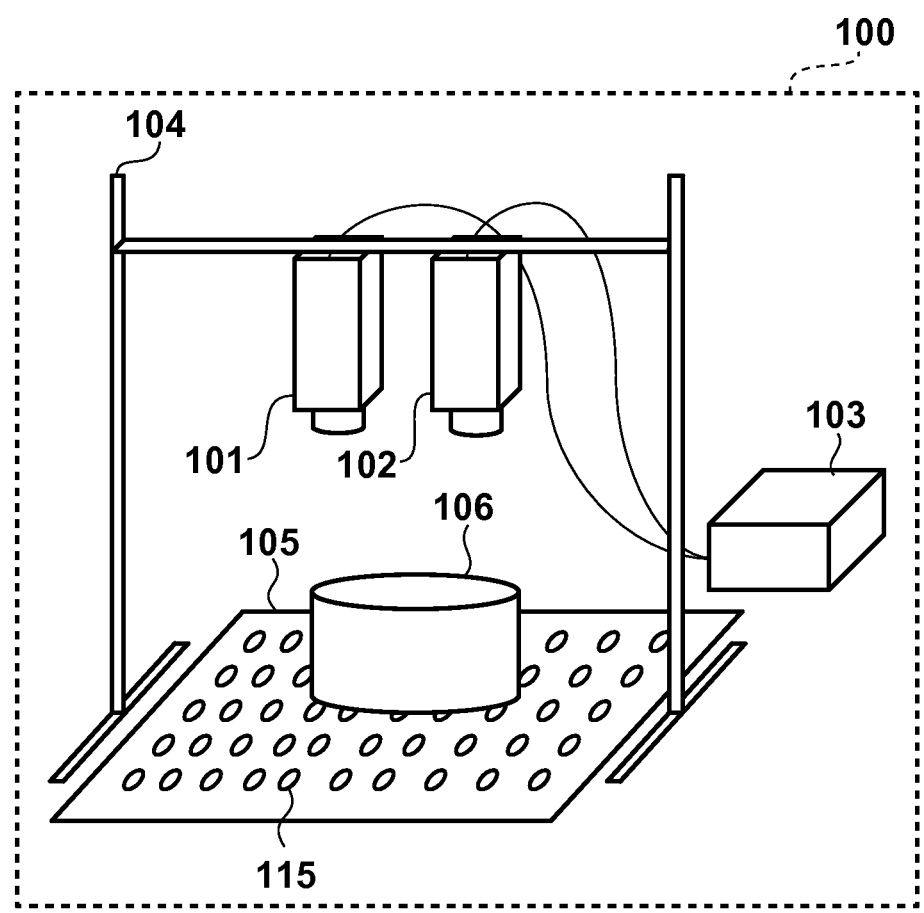
FIG. 14 is a view schematically showing the overall arrangement of a three-dimensional shape measurement apparatus according to the fifth embodiment.

FIG. 14 is a view schematically showing the overall arrangement of the three-dimensional shape measurement apparatus according to the fifth embodiment. A three-dimensional shape measurement apparatus 100 includes a projection device 101, an image capturing device 102, a control unit 103, a support structure 104, and a target object support structure 105, as in the first embodiment. On the target object support structure 105, a target object 106 is arranged, and reference plane markers 115 are arranged near the target object 106. The projection device 101, the image capturing device 102, the control unit 103, the support structure 104, and the target object 106 are the same as those in the first embodiment.

The target object support structure 105 is a table for setting the target object 106 on it. The surface of the target object support structure 105 is flat. On the target object support structure 105, the plurality of reference plane markers 115 are arranged around the target object 106 at locations falling within the field of view of the projection device 101. A flat surface constituting the surface of the target object support structure 105 is manufactured by a material and method capable of ensuring very high flatness. This flat surface ensures accuracy with which the three-dimensional coordinates of the reference plane markers 115 can be regarded as known ones.

Assume that the reference plane markers 115 are perfect circles arranged at equal intervals, and the three-dimensional coordinate of the center of each circle has been known. Since the target object 106 is arranged on the target object support structure 105, some of the reference plane markers 115 are shielded and cannot be observed from the image capturing device 102. For this reason, many reference plane markers 115 are arranged to obtain a satisfactory number of remaining reference plane markers 115 observable by the image capturing device 102. Note that the reference plane markers 115 need not always be perfect circles. For example, double circles, ellipses, a checkered pattern, or another arbitrary pattern is usable.

The arrangement of functional elements for implementing a three-dimensional shape measurement method according to the fifth embodiment, and the relation between the functional elements are the same as those in the first embodiment (FIG. 2). A projection unit 201, an image capturing unit 203, an image input unit 204, a parameter storage unit 206, and a control unit 210 are the same as those in the first embodiment.

A projection pattern generation unit 202 generates a pattern image and sends it to the projection unit 201. For example, the projection pattern generation unit 202 generates an image for projecting pattern light necessary to implement a conventional method such as binary or Gray code structured light or the phase shift method. Since the first embodiment uses only the lateral component $u_i$ out of the projection coordinate, it suffices to project a striped pattern image only in the longitudinal direction. However, the fifth embodiment also uses the longitudinal component $v_i$ of the projection coordinate. Thus, the projection pattern generation unit 202 also generates a striped pattern image in the lateral direction in addition to one in the longitudinal direction, and sends it to the projection unit 201. Unlike the first embodiment, the projection pattern generation unit 202 does not generate the image of the projection marker 108.

An image processing unit 205 receives a captured image from the image input unit 204 and performs necessary image processing. The image processing to be performed by the image processing unit 205 includes extraction processing of the reference plane markers 115, and decoding processing of pattern light included in an image.

The image processing unit 205 performs extraction processing of the reference plane markers 115 by using an image input from the image processing unit 205. This extraction processing associates, via the reference plane markers 115, the pixels of the image captured by the image capturing device 102 with three-dimensional coordinates in the coordinate system of the calibration object 113. Since the reference plane markers 115 are perfect circles, the image processing unit 205 extracts the regions of circles from the image, and calculates image coordinates corresponding to the centers of the circles. The method of calculating the center of a circle in an image can be an arbitrary method including a method of estimating, from a detected edge, parameters constituting a circle, and a method of detecting a barycenter by template matching.

The image processing unit 205 performs pattern decoding processing using a plurality of images input from the image processing unit 205. This decoding processing associates, via the reference plane markers 115, the projection coordinates of a pattern image projected by the projection device 101 with three-dimensional coordinates in the coordinate system of the calibration object 113. Since the projection device 101 cannot observe an image, projection coordinates corresponding to the reference plane markers 115 are associated using image coordinates in the image capturing device 102.

More specifically, the decoding processing has already associated image coordinates with projection coordinates, so projection coordinates corresponding to image coordinates that correspond to the reference plane markers 115 are selected. In general, the projection device 101 and the image capturing device 102 are configured so that one pixel of the image capturing device 102 becomes smaller than one pixel of the projection device 101 on the object plane. To obtain the projection coordinates of the reference plane markers 115 with high accuracy, processing of interpolating and estimating the projection coordinates by using a plurality of correspondences needs to be performed. The control unit 103 implements the function of the image processing unit 205.

A fluctuation calculation unit 207 calculates both the temporal fluctuation of projected light and the vibration of the support structure 104, and further calculates a three-dimensional translation/rotation between the projection device 101 and the image capturing device 102 while removing the influence of the fluctuation and vibration. The control unit 103 implements the function of the fluctuation calculation unit 207.

<2. Arrangement of Fluctuation Calculation Unit 207>
<2.1. Processing of Calculating Vibration of Support Structure 104>

The fluctuation calculation unit 207 calculates a matrix $R_{WCt}$ representing a three-dimensional translation/rotation amount from a measurement area at target time t to the image capturing device 102. More specifically, the fluctuation calculation unit 207 calculates the matrix $R_{WCt}$ from known three-dimensional coordinates and corresponding image coordinates as for the reference plane markers 115 observed by the image capturing device 102. A method of obtaining the three-dimensional translation/rotation amount of the image capturing unit from the correspondence with coordinates projected on an image for points having known three-dimensional coordinates is known, and a description thereof will be omitted.

At reference time t=0, the fluctuation calculation unit 207 sends $R_{WC0}$ at this time as a reference three-dimensional translation/rotation amount to the parameter storage unit 206. The parameter storage unit 206 holds this parameter. At other times, this value is read out from the parameter storage unit 206.

Since the three-dimensional coordinates of the reference plane markers 115 do not change over time, the difference in the three-dimensional translation/rotation amount between $R_{WCt}$ and $R_{WC0}$ can be regarded as the vibration of the support structure 104. In subsequent processing, it suffices to always use $R_{WC0}$ as the external parameter of the image capturing device 102.

The three-dimensional coordinates of the reference plane markers 115 may change over time owing to the vibration of the support structure 104. However, this change influences only the relation between the target object 106 and the image capturing device 102 in calculation of the three-dimensional coordinate of the target object 106. Even in this case, therefore, $R_{WC0}$ may always be used as the external parameter of the image capturing device 102.

<2.2. Processing of Calculating Three-Dimensional Translation/Rotation Between Projection Device 101 and Image Capturing Device 102>

The fluctuation calculation unit 207 calculates $R_{CPt}$ by a bundle adjustment method using image coordinates and projection coordinates corresponding to the three-dimensional coordinates of the reference plane markers 115, and $R_{WC0}$ obtained before.

<2.3. Processing of Calculating Temporal Fluctuation of Projected Light>

As for the reference plane marker 115 at time t, a corresponding projection coordinate is represented by $p_{pjt} = (u_{pjt}, v_{pjt}, 1)^T$, where j is a suffix for identifying the reference plane marker 115. Since all the reference plane markers 115 are arranged on the same plane, a relation given by equation (21) is established for all t and j:

$$\lambda_{pt} \begin{pmatrix} u_{pj0} \\ v_{pj0} \\ 1 \end{pmatrix} = H_{pt} \begin{pmatrix} u_{pjt} \\ v_{pjt} \\ 1 \end{pmatrix} \quad (21)$$

where $\lambda_{pt}$ is a scaling coefficient and is not used in subsequent processing.

The fluctuation calculation unit 207 calculates the homography $H_{pt}$ that satisfies equation (21), and calculates $p''_{pjt}$ by converting $p_{pjt}$ by $H_{pt}$ for all j. $p''_{pjt}$ is a projection coordinate after modifying the temporal fluctuation of the projection device 101.

At reference time t=0, the fluctuation calculation unit 207 sends the reference coordinate ($u_{pj0}$, $v_{pj0}$) to the parameter storage unit 206. The parameter storage unit 206 holds the reference coordinate. At other times, these values are read out from the parameter storage unit 206.

The fluctuation calculation unit 207 calculates again a matrix $R_{CPt}$ representing a three-dimensional translation/rotation amount from the image capturing device 102 to the projection device 101 by using the projection coordinate $p''_{pjt}$ obtained after modifying the fluctuation. In $R_{CPt}$ calculated at this stage, an error arising from the influence of the temporal fluctuation of projected light and the vibration of the support structure 104 becomes smaller than an error in $R_{CPt}$ obtained last time. However, the fluctuation and vibration mutually influence each other and are not completely removed. For this reason, the fluctuation calculation unit 207 alternately iterates the calculation processing of $R_{CPt}$ and the modification of the projection coordinate.

The fluctuation calculation unit 207 sends, to a three-dimensional coordinate calculation unit 208, the three-dimensional translation/rotation matrix $R_{WC0}$ from the measurement area to the image capturing device 102, the three-dimensional translation/rotation matrix $R_{CPt}$ between the projection device 101 and the image capturing device 102, and the homography $H_{pt}$, which have been calculated by the above-described processing. As described above, the influence of the temporal fluctuation of projected light and the vibration of the support structure 104 has been removed from these parameters.

The three-dimensional coordinate calculation unit 208 corrects the vibration of the support structure 104 and the temporal fluctuation of projected light by using $R_{WC0}$, $R_{CPt}$, and $H_{pt}$ sent from the fluctuation calculation unit 207, and calculates the three-dimensional coordinate of the target object 106. The control unit 103 implements the function of the three-dimensional coordinate calculation unit 208.

The three-dimensional coordinate calculation unit 208 receives the projection coordinate and image coordinate of the target object 106 from the image processing unit 205. The three-dimensional coordinate calculation unit 208 receives $R_{WC0}$, $R_{CPt}$, and $H_{pt}$ from the fluctuation calculation unit 207, and the internal parameters of the image capturing device 102 and projection device 101 from the parameter storage unit 206.

When $R_C$ in the first embodiment is regarded as $R_{WC0}$ in the fifth embodiment, $R_P$ is regarded as the product of $R_{WC0}$ and $R_{CPt}$ (that is, $R_{WC0} \cdot R_{CPt}$), and $H_p$ is regarded as $H_{pt}$, processing to be performed by the three-dimensional coordinate calculation unit 208 is the same as one in the first embodiment.

A result output unit 209 outputs the three-dimensional coordinate of the target object 106 that has been calculated by the three-dimensional coordinate calculation unit 208. The output destination is, for example, a display device, another computer, or an auxiliary storage device (none are shown) connected to the control unit 103. The control unit 103 implements the function of the result output unit 209.

<3. Operation of Apparatus>

Figure 15:
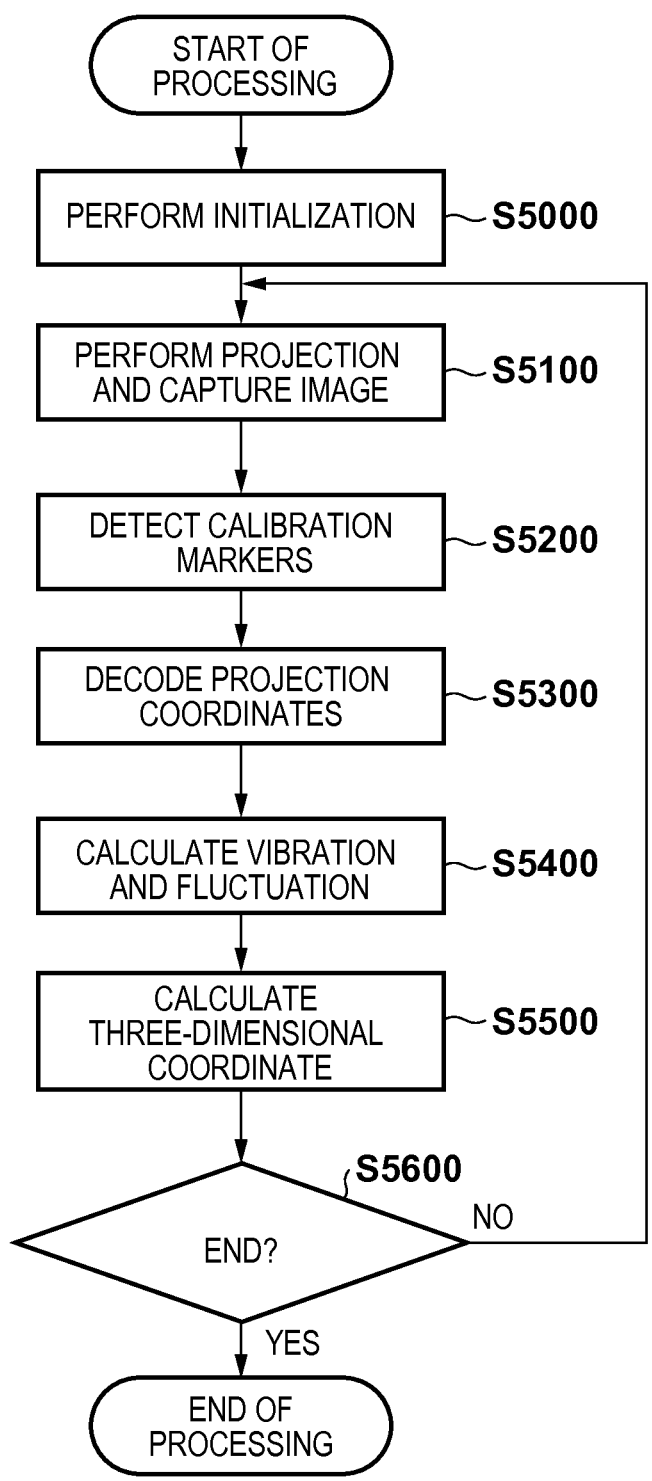
FIG. 15 is a flowchart showing the operation of the three-dimensional shape measurement apparatus according to the fifth embodiment.

FIG. 15 is a flowchart showing the operation of the three-dimensional shape measurement apparatus according to the fifth embodiment. First, when the apparatus is activated, step S5000 starts.

In step S5000, initialization processing is performed. The initialization processing in step S5000 includes processing of reading out the three-dimensional coordinates of the reference plane markers 115 from the auxiliary storage device, and holding them in the parameter storage unit 206.

The initialization processing also includes processing of measuring $R_{CW0}$ at reference time and holding it in the parameter storage unit 206. Further, processing of holding the projection coordinate ($u_{pj0}$, $v_{pj0}$) in the parameter storage unit 206 is also performed at this stage. When the number of types of pattern images is small, the projection pattern generation unit 202 generates all pattern images at this time, and the parameter storage unit 206 holds them.

In step S5100, the projection pattern generation unit 202 generates a projection pattern, and the projection unit 201 projects it as pattern light. At the same time, the image capturing unit 203 captures an image of the target object 106 to which the pattern light has been projected, and the image input unit 204 holds the image. This processing is repeated until a necessary number of pattern images are projected and image capturing is completed.

In step S5200, the image processing unit 205 extracts the reference plane markers 115 from the captured image, and associates three-dimensional coordinates in the coordinate system on a calibration object 113 with image coordinates. In step S5300, the image processing unit 205 decodes projection coordinates by using the captured images, and associates the image coordinates with the projection coordinates.

Figure 16:
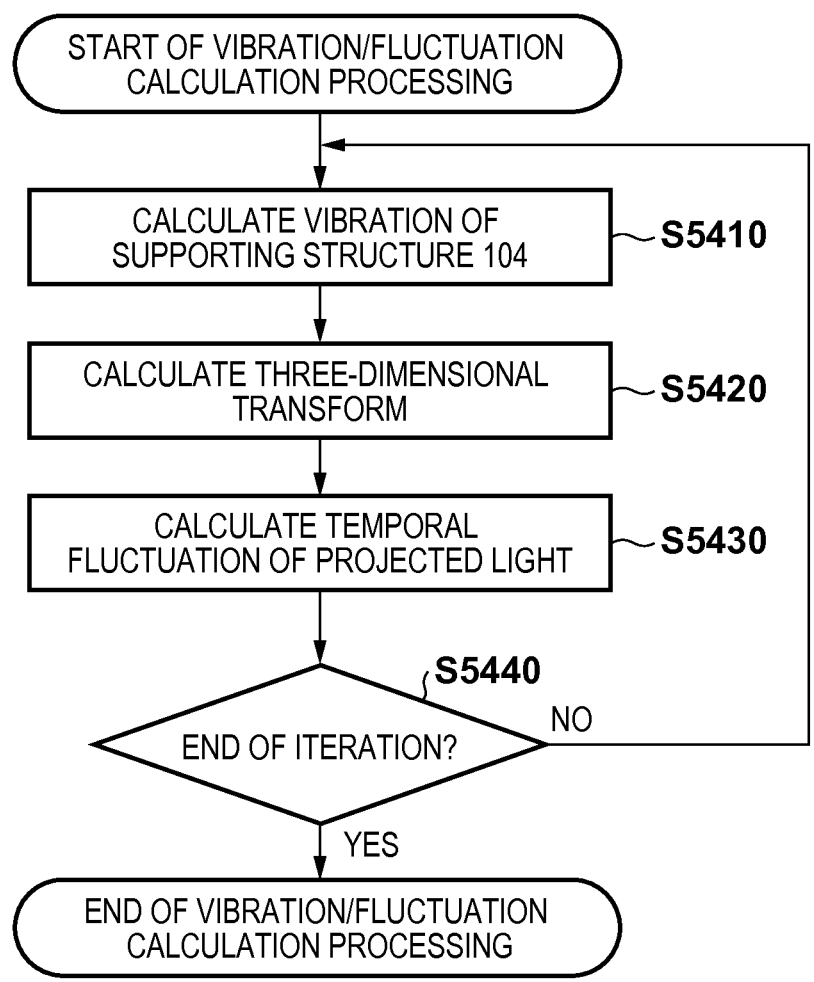
FIG. 16 is a flowchart showing details of vibration/fluctuation correction processing according to the fifth embodiment.

In step S5400, the fluctuation calculation unit 207 calculates the vibration of the support structure 104, the temporal fluctuation of projected light, and a three-dimensional translation/rotation amount from the image capturing device 102 to the projection device 101. FIG. 16 is a flowchart showing details of vibration/fluctuation correction processing (S5400) according to the fifth embodiment.

In step S5410, the fluctuation calculation unit 207 calculates the vibration of the support structure 104. In step S5420, the fluctuation calculation unit 207 calculates a three-dimensional translation/rotation amount from the image capturing device 102 to the projection device 101. In step S5430, the fluctuation calculation unit 207 calculates the temporal fluctuation of projected light. In step S5440, the fluctuation calculation unit 207 determines whether a preset iteration end condition has been satisfied. If the condition has been satisfied, the internal processing ends, and the process advances to step S5500. If the condition has not been satisfied, the process returns to step S5410.

In step S5500, the three-dimensional coordinate calculation unit 208 calculates the three-dimensional coordinate of the target object 106. In step S5600, the apparatus ends the operation based on an instruction from the user. Alternatively, the process returns to step S5100.

As described above, the three-dimensional shape measurement apparatus according to the fifth embodiment can obtain the three-dimensional coordinate of a target object with high accuracy. Especially when the geometric relation between the image capturing device 102 and the projection device 101 is unknown, the influence of the temporal fluctuation can be preferably removed using reference plane markers that are arranged near the target object and have known three-dimensional coordinates.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-243343 filed Nov. 25, 2013, which is hereby incorporated by reference herein in its entirety.

What is claimed is:

1. A three-dimensional shape measurement apparatus that measures a coordinate of a surface of a target object based on a captured image including the target object onto which a pattern is projected, comprising:
   a projection unit configured to project a first pattern and a second pattern onto a measurement area in which the target object is placed and a reference marker is arranged, wherein the first pattern is a pattern for obtaining a coordinate of a surface of the target object and the second pattern is a pattern for correcting a projection position by the projection unit;
   an image capturing unit configured to capture an image of the measurement area onto which at least one of the first pattern and the second pattern are projected; and
   a control unit, including at least one processor, configured to:
   derive, based on an image captured by the image capturing unit, a first correction value for correcting a position of the projection unit and the image capturing unit, and a second correction value for correcting projection position of the projection unit; and
   obtain a coordinate on a surface of the target object based on an image captured by the image capturing unit, and the first correction value and the second correction value that have been derived,
   wherein the projection unit and the image capturing unit are fixed on a support structure and the position of the projection unit and the image capturing unit is changed by fluctuation of the support structure.

2. The apparatus according to claim 1, wherein the control unit is configured to alternately iteratively execute derivation processing of the first correction value and derivation processing of the second correction value until a predetermined condition is satisfied.

3. The apparatus according to claim 2, wherein the predetermined condition is at least one of conditions that:
   a difference between a first correction value derived in preceding iterative execution and a first correction value derived in current iterative execution becomes not larger than a predetermined threshold;
   a difference between a second correction value derived in preceding iterative execution and a second correction value derived in current iterative execution becomes not larger than a predetermined threshold; and
   a predetermined time has elapsed after a start of iterative execution.

4. The apparatus according to claim 1, wherein and the control unit associates, based on an image captured by the image capturing unit when the projection unit projects the second pattern onto the support structure, each pixel of the second pattern with each pixel of a second pattern included in the captured image, and derives a fluctuation of a coordinate of the reference marker.

5. The apparatus according to claim 1, wherein
   the first pattern includes a plurality of striped pattern images different in resolution, and
   the image capturing unit captures each of the plurality of striped pattern images projected by the projection unit.

6. A method of controlling a three-dimensional shape measurement apparatus that measures a coordinate of a surface of a target object based on a captured image including the target object onto which a pattern is projected, the three-dimensional shape measurement apparatus including:
   a projection unit configured to project a first pattern and a second pattern onto a measurement area in which the target object is placed and a reference marker is arranged, wherein the first the pattern is a pattern for obtaining a coordinate of a surface of the target object and the second pattern is a pattern for correcting a projection position by the projection unit; and
   an image capturing unit configured to capture an image of the measurement area onto which at least one of the first pattern and the second pattern are projected, wherein the projection unit and the image capturing unit are fixed on a support structure,
   the control method comprising:
   deriving, based on an image captured by the image capturing unit, a first correction value for correcting a position of the projection unit and the image capturing unit, and a second correction value for correcting projection position of the projection unit, wherein the position of the projection unit and the image capturing unit is changed by fluctuation of the support structure; and
   obtaining a coordinate on a surface of the target object based on an image captured by the image capturing unit, and the first correction value and the second correction value that have been derived in the deriving.

7. The apparatus according to claim 1, wherein the control unit estimates a plane, to which the reference marker is arranged, based on the image, and derives the first correction value based on the estimated plane.

8. The apparatus according to claim 7, wherein the control unit derives a three-dimensional coordinate of the reference marker in the image based on the first pattern in the image, and estimates the plane based on the derived three-dimensional coordinate of the reference marker.

9. The apparatus according to claim 1, wherein the control unit detects the second pattern in the image, and derives the second correction value based on the detected second pattern.

10. The apparatus according to claim 9, wherein the control unit derives the second correction value by calculating a homography of a plane, on which the second pattern is projected, based on the detected second pattern.

11. The apparatus according to claim 1, wherein the control unit corrects coordinates of the projection unit and the image capturing unit based on the first correction value, corrects a projection position by the projection unit based on the second correction value, and obtains the coordinate on the surface of the target object based on the corrected coordinates of the projection unit and the image capturing unit and the corrected projection position by the projection unit.

12. A three-dimensional shape measurement apparatus that measures a coordinate of a surface of a target object based on a captured image including the target object onto which a pattern is projected, comprising:
 a projection unit configured to project a first pattern to a measurement area on which the target object is placed, wherein the first pattern is a pattern for obtaining a coordinate of a surface of the target object;
 an image capturing unit configured to capture an image of the measurement area on which the first pattern is projected, wherein the projection unit and the image capturing unit are fixed on a support structure; and
 a control unit, including at least one processor, configured to:
  derive, based on an image captured by the image capturing unit, a first correction value for correcting a position of the projection unit and the image capturing unit, wherein the position of the projection unit and the image capturing unit is changed by fluctuation of the support structure; and
  obtain a coordinate on a surface of the target object based on an image captured by the image capturing unit and the first correction value.

13. The apparatus according to claim 12, wherein the control unit estimates a plane, to which a reference marker is arranged, based on the image, and derives the first correction value based on the estimated plane.

14. The apparatus according to claim 13, wherein the control unit derives a three-dimensional coordinate of the reference marker in the image based on the first pattern in the image, and estimates the plane based on the derived three-dimensional coordinate of the reference marker.

15. A method of controlling a three-dimensional shape measurement apparatus that measures a coordinate of a surface of a target object based on a captured image including the target object onto which a pattern is projected, the apparatus including:
 a projection unit configured to project a first pattern to a measurement area on which the target object is placed, wherein the first pattern is a pattern for obtaining a coordinate of a surface of the target object, and
 an image capturing unit configured to capture an image of the measurement area on which the first pattern is projected, wherein the projection unit and the image capturing unit are fixed on a support structure,
the control method comprising:
 deriving, based on an image captured by the image capturing unit, a first correction value for correcting a position of the projection unit and the image capturing unit, wherein the position of the projection unit and the image capturing unit is changed by fluctuation of the support structure; and
 obtaining a coordinate on a surface of the target object based on an image captured by the image capturing unit and the first correction value.

* * * * *